(12) United States Patent
Iwasaki

(10) Patent No.: US 11,887,390 B2
(45) Date of Patent: Jan. 30, 2024

(54) INFORMATION PROCESSING APPARATUS, INFORMATION PROCESSING SYSTEM, INFORMATION PROCESSING METHOD, AND NON-TRANSITORY RECORDING MEDIUM

(71) Applicant: Ryo Iwasaki, Tokyo (JP)

(72) Inventor: Ryo Iwasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 190 days.

(21) Appl. No.: 17/329,557

(22) Filed: May 25, 2021

(65) Prior Publication Data
US 2022/0019785 A1    Jan. 20, 2022

(30) Foreign Application Priority Data

Jul. 14, 2020  (JP) ................................ 2020-120481

(51) Int. Cl.
*G06V 30/412* (2022.01)
*G06V 30/10* (2022.01)

(52) U.S. Cl.
CPC ............ *G06V 30/412* (2022.01); *G06V 30/10* (2022.01)

(58) Field of Classification Search
CPC ............................ G06V 30/412; G06V 30/10
See application file for complete search history.

(56) References Cited

U.S. PATENT DOCUMENTS

| 2008/0115080 | A1 | 5/2008 | Matulic et al. |
| 2021/0073535 | A1* | 3/2021 | Enomoto ............. G06V 30/416 |
| 2022/0101643 | A1* | 3/2022 | Takagi .................. G06F 40/186 |

FOREIGN PATENT DOCUMENTS

| JP | 2008-140377 | 6/2008 |
| JP | 2016-051339 | 4/2016 |
| JP | 2019-169025 | 10/2019 |

* cited by examiner

*Primary Examiner* — Helen Zong
(74) *Attorney, Agent, or Firm* — IPUSA, PLLC

(57) ABSTRACT

An information processing apparatus includes circuitry. The circuitry receives an input of ledger sheet image data read from a ledger sheet. The circuitry identifies, among a plurality of character strings extracted through character recognition performed on the ledger sheet image data, a reference point character string based on relative positions of the reference point character string and a particular character string of the plurality of character strings. The reference point character string forms a reference point for extraction. The circuitry extracts a corresponding character string corresponding to the reference point character string based on relative positions of the corresponding character string and the reference point character string.

10 Claims, 22 Drawing Sheets

FIG. 3

| ITEM NAME | EXTRACTION REFERENCE POINT | EXTRACTION DIRECTION | EXTRACTION RANGE | REFERENCE TO DICTIONARY |
|---|---|---|---|---|
| BANK NAME | FINANCIAL INSTITUTION/PAYEE | RIGHT, DOWN | 1 | |
| BRANCH NAME | EXTRACTED <BANK NAME> | RIGHT, DOWN | 1 | ✓ |
| ACCOUNT TYPE | EXTRACTED <BANK NAME> | RIGHT, DOWN, LEFT | 2 | ✓ |
| | EXTRACTED <BRANCH NAME> | RIGHT, DOWN | 1 | ✓ |
| ACCOUNT NUMBER | EXTRACTED <ACCOUNT TYPE> | RIGHT, DOWN | 3 | ✓ |
| | EXTRACTED <ACCOUNT NUMBER> | RIGHT | 1 | |
| ACCOUNT HOLDER | EXTRACTED <BANK NAME> | DOWN | 4 | |
| | EXTRACTED <ACCOUNT TYPE> | DOWN | 2 | |

| BRANCH NAME EXTRACTION CONDITION | ACCOUNT TYPE EXTRACTION CONDITION | ACCOUNT NUMBER EXTRACTION CONDITION |
|---|---|---|
| *BRANCH<br>*MAIN BRANCH<br>*OFFICE<br>*SALES OFFICE<br>*SALES DEPARTMENT | SAVING, CHECKING | NUMBERS |

| TENANT NAME | PAYEE INFORMATION | | | | |
|---|---|---|---|---|---|
| | BANK NAME | BRANCH NAME | ACCOUNT TYPE | ACCOUNT NUMBER | ACCOUNT HOLDER | USER SELECTION |
| AA CORPORATION | ZZZ BANK | AAA BRANCH | SAVING | 1111111 | BB INC. | ✓ |
| | ... | ... | ... | ... | ... | ... |

272

| TENANT NAME (BILLING ADDRESS) | BILLER | PAYEE INFORMATION | | | | |
|---|---|---|---|---|---|---|
| | | BANK NAME | BRANCH NAME | ACCOUNT TYPE | ACCOUNT NUMBER | ACCOUNT HOLDER | USER SELECTION |
| AA CORPORATION | BB INC. | XXX BANK | AAA BRANCH | SAVING | 1234567 | BB INC. | ✓ |
| | | YYY BANK | BBB BRANCH | SAVING | 7654321 | BB INC. | |
| ... | | | | | | | |

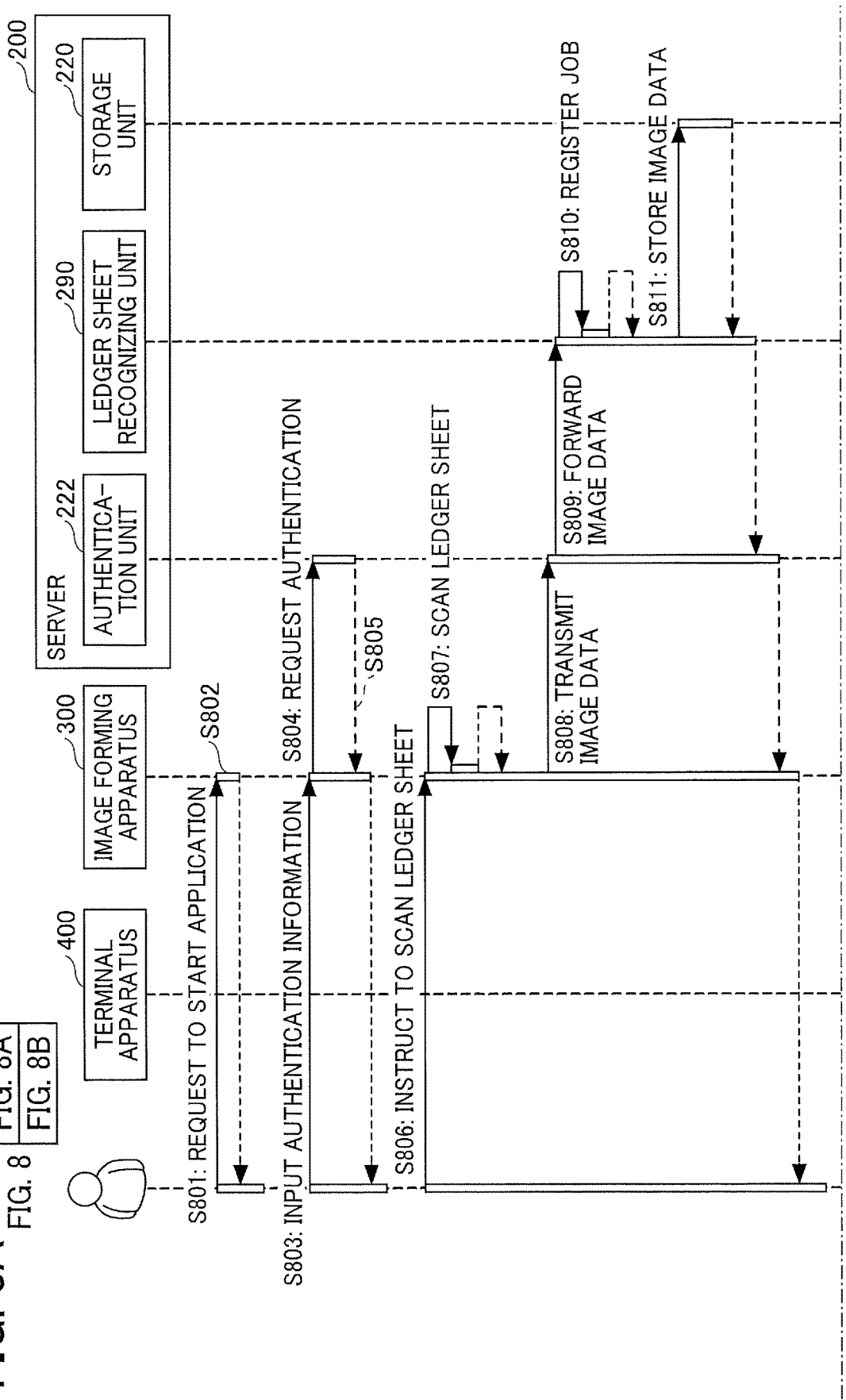

FIG. 9

| JOB ID | TENANT ID | LEDGER SHEET IMAGE FILE PATH | RECOGNITION RESULT FILE PATH | STATUS |
|---|---|---|---|---|
| J1 | 101 | xxx | yyyy | UNPROCESSED |
| J2 | 102 | xyy | ... | ... |
| ⋮ | ⋮ | ⋮ | ⋮ | ⋮ |

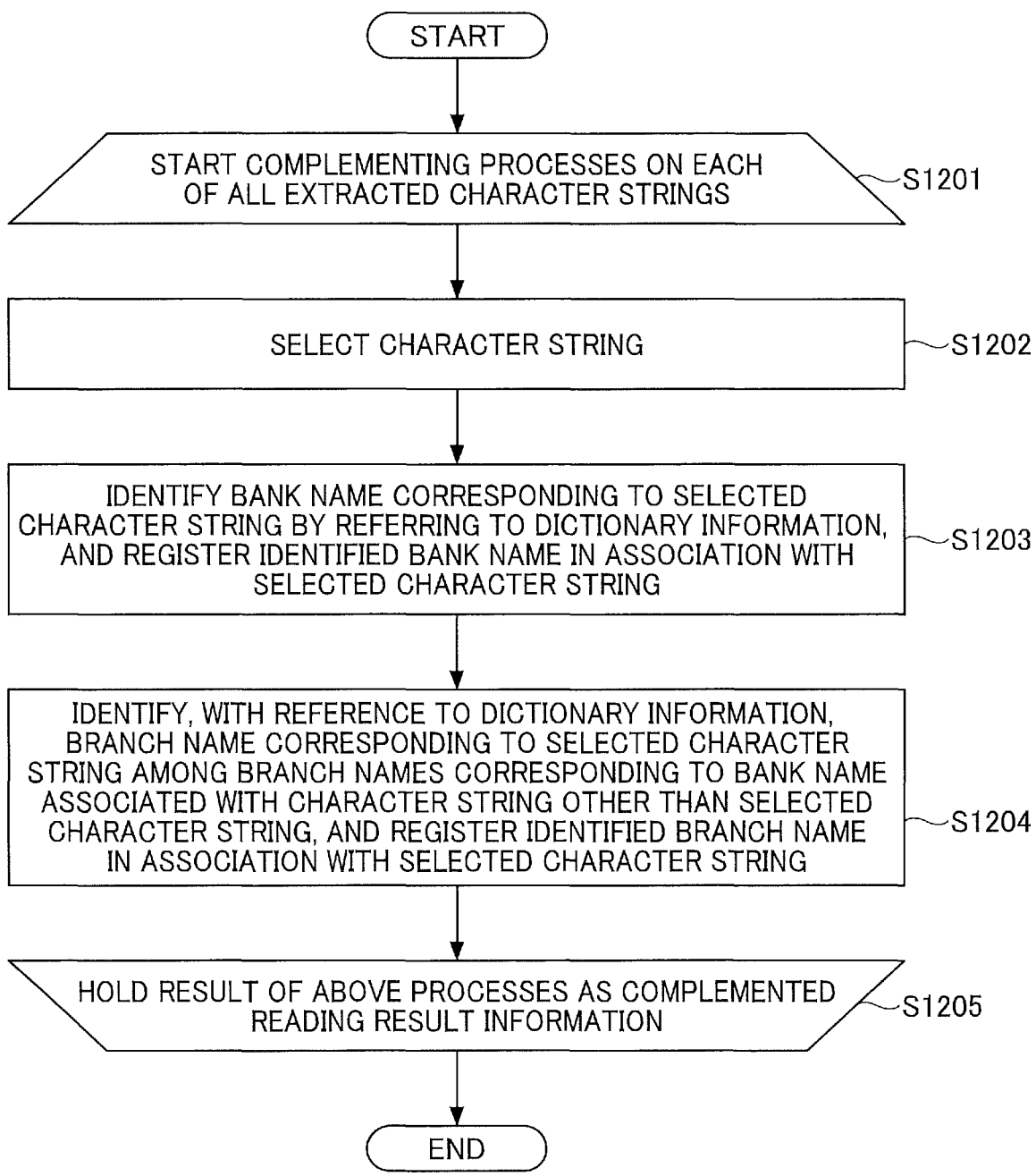

FIG. 13A
~131

| ID | X COORDINATE | Y COORDINATE | WIDTH OF CHARACTER | HEIGHT OF CHARACTER | DEGREE OF CERTAINTY | CHARAC-TER |
|---|---|---|---|---|---|---|
| 72 | 319 | 552 | 44 | 45 | 99 | お |
| 73 | 363 | 552 | 47 | 45 | 99 | 振 |
| 74 | 406 | 552 | 43 | 42 | 99 | 込 |
| 75 | 452 | 552 | 46 | 42 | 99 | 先 |
| 76 | 319 | 620 | 45 | 45 | 99 | × |
| 77 | 364 | 620 | 46 | 46 | 99 | × |
| 78 | 410 | 620 | 45 | 45 | 99 | × |
| 79 | 455 | 620 | 45 | 45 | 99 | 銀 |
| 80 | 500 | 620 | 45 | 45 | 99 | 行 |
| 81 | 590 | 620 | 45 | 46 | 99 | A |
| 82 | 635 | 620 | 46 | 45 | 99 | A |
| 83 | 682 | 620 | 45 | 46 | 99 | B |
| 84 | 726 | 620 | 45 | 45 | 99 | 支 |
| 85 | 771 | 620 | 45 | 45 | 99 | 店 |

FIG. 13B
~132

| CELL ID | X COORDINATE | Y COORDINATE | WIDTH OF CHARACTER STRING | HEIGHT OF CHARACTER STRING | CHARACTER STRING |
|---|---|---|---|---|---|
| 17 | 319 | 552 | 147 | 45 | PAYEE |
| 18 | 319 | 620 | 181 | 46 | XXY BANK |
| 19 | 500 | 620 | 179 | 46 | AAB BRANCH |

FIG. 14

| ITEM NAME | ITEM VALUE |
|---|---|
| BANK NAME | XXX BANK |
| BRANCH NAME | AAA BRANCH |
| ACCOUNT TYPE | SAVING |
| ACCOUNT NUMBER | 1234567 |
| ACCOUNT HOLDER | BB INC. |

| INVOICE NUMBER | BILLER | DATE OF INVOICE | BILLING AMOUNT | ... | BANK NAME | BRANCH NAME | ... | ... |
|---|---|---|---|---|---|---|---|---|
| A123-03 | BB INC. | 2018/07/20 | 1,790,208 | ... | XXX BANK | AAA BRANCH | ... | ... |

| CELL ID | X COOR-DINATE | Y COOR-DINATE | WIDTH OF CHARAC-TER STRING | HEIGHT OF CHARAC-TER STRING | CHARAC-TER STRING | CHARACTER STRING COMPLEMENTED AS BANK NAME | CHARACTER STRING COMPLEMENTED AS BRANCH NAME |
|---|---|---|---|---|---|---|---|
| ... | ... | ... | ... | ... | ... | ... | ... |
| 17 | 319 | 552 | 147 | 45 | PAYEE | PAYMENT BANK | ...,17:"",18:"PAYMENT BRANCH",19:"PAYMENT BRANCH",... |
| 18 | 319 | 620 | 181 | 46 | XXY BANK | XXX BANK | ...,17:"XXX BRANCH",18:"",19:"XXZ BRANCH",... |
| 19 | 500 | 620 | 179 | 46 | AAB BRANCH | AAC BRANCH | ...,17:"ABC BRANCH",18:"AAA BRANCH",19:"BAB BRANCH" |
| ... | ... | ... | ... | ... | ... | ... | ... |

‹CHECK/CHANGE LEDGER SHEET

Page [1/1]   Zoom ⊕ ⊖ □

INVOICE

DATE OF INVOICE: JULY 20, 2018
FROM: BB INC.

TO: AA CORPORATION

PLEASE PROCEED WITH PAYMENT AS FOLLOWS:
PAYMENT DUE DATE: AUGUST 20, 2018

DESCRIPTION:
CUSTOMER NO.   AI-4567-89
INVOICE NO.    A123-03
CUTOFF DATE    JUNE 30, 2018

INVOICE TOTAL  ¥1,790,208
CONSUMPTION TAX ¥132,608

TAX-INCLUSIVE
PRICE
AUTOMATIC
CALCULATION

PAYEE
XXX BANK  AAA BRANCH  SAVING 1234567  BB INC.
YYY BANK  BBB BRANCH  SAVING 7654321  BB INC.

```
XXX BANK     YYY BANK
AAA BRANCH   BBB BRANCH
SAVING       SAVING
1234567      7654321
BB INC.      BB INC.
```  — 310

310A

SAMPLE DATA

---

UNPROCESSED — 306

INVOICE INFORMATION
INVOICE NUMBER [A123-03]   DATE OF INVOICE [JULY 20, 2018]
BILLER [BB INC.]
BILLING AMOUNT [1,790,208]   BILLING AMOUNT (TAX EXCLUDED) [1,657,600]
(TAX INCLUDED)

PAYEE INFORMATION ▼ XXX BANK — 320
BANK NAME [XXX BANK] — 321a   BANK CODE [9999]   BRANCH NAME [AAA BRANCH]   BRANCH CODE [9999]
ACCOUNT TYPE [SAVING] — 323   ACCOUNT NUMBER [1234567]   ACCOUNT HOLDER [BB INC.]
321                              322a     322

JOURNAL [📇]   NO TAX CALCULATION   2018/08/20
TOTAL DEBIT 1,790,208   TOTAL DEBIT 1,790,208     0
323a             132,608

2120          3230
BUILDING      ACCRUED
EQUIPMENT     EXPENSE

SUBSIDIARY CODE          SUBSIDIARY CODE
0001  :TOKYO SECTION     0001  :TOKYO SECTION

NOTES

+ADD JOURNAL ENTRY

[SAVE AS DRAFT] — 307    [CONFIRM] — 308

| PAYER ACCOUNT INFORMATION | ZZZ BANK | AAA BRANCH | SAVING | 1111111 | BB INC. ✓ |
|---|---|---|---|---|---|
| PAYEE ACCOUNT INFORMATION | XXX BANK | AAA BRANCH | SAVING | 1234567 | BB INC. ✓ |
| BILLING AMOUNT | 1,790,208 | | | | |
| PAYMENT TRANSACTION DATE | 2018/08/15 | | | | |

| CHARACTER STRING ID | BRANCH NAME | ACCOUNT TYPE | ACCOUNT NUMBER | ACCOUNT HOLDER |
|---|---|---|---|---|
| 18 | AAA BRANCH | SAVING | 1234567 | BB INC. |
| 19 | SAVING BRANCH | | 1234567 | BB INC. |
| ... | | | | |

241

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-120481 filed on Jul. 14, 2020 in the Japan Patent Office, the entire disclosure of which is hereby incorporated by reference herein.

BACKGROUND

Technical Field

The present invention relates to an information processing apparatus, an information processing system, an information processing method, and a non-transitory recording medium.

Description of the Related Art

There has been a ledger sheet recognition technique of reading character strings from the image of a ledger sheet and extracting mutually associated character strings from the read character strings as an item name and an item value.

The ledger sheet is designed in various layouts including one in which one character string is associated with a plurality of character strings. In this case, it is difficult to correctly extract the plurality of character strings corresponding to the one character string.

SUMMARY

In one embodiment of this invention, there is provided an improved information processing apparatus that includes, for example, circuitry. The circuitry receives an input of ledger sheet image data read from a ledger sheet. The circuitry identifies, among a plurality of character strings extracted through character recognition performed on the ledger sheet image data, a reference point character string based on relative positions of the reference point character string and a particular character string of the plurality of character strings. The reference point character string forms a reference point for extraction. The circuitry extracts a corresponding character string corresponding to the reference point character string based on relative positions of the corresponding character string and the reference point character string.

In one embodiment of this invention, there is provided an improved information processing system that includes, for example, the above-described information processing apparatus and a terminal apparatus including a display. The circuitry of the information processing apparatus outputs screen data for displaying a recognition result screen. The recognition result screen includes a ledger sheet image represented by the ledger sheet image data and information including, as an item value of an item name associated with the reference point character string, the corresponding character string extracted based on the relative positions of the corresponding character string and the reference point character string. The display of the terminal apparatus displays the recognition result screen based on the screen data. In one embodiment of this invention, there is provided an improved information processing method that includes, for example, receiving an input of ledger sheet image data, identifying, among a plurality of character strings extracted through character recognition performed on the ledger sheet image data, a reference point character string forming a reference point for extraction, and extracting a corresponding character string corresponding to the reference point character string based on relative positions of the corresponding character string and the reference point character string.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 3 and 4 are tables illustrating an example of an extraction definition database in the server of the embodiment;

FIG. 6 includes tables illustrating an example of a tenant database in the server of the embodiment;

FIGS. 8A and 8B are a sequence diagram illustrating an operation of the ledger sheet recognition system of the embodiment;

FIG. 9 is a table illustrating an example of a job list of the embodiment;

FIGS. 10, 11, and 12 are flowcharts illustrating processes of a ledger sheet recognizing unit in the server of the embodiment;

FIGS. 13A and 13B are tables illustrating character recognition of the embodiment;

FIG. 14 is a table illustrating an example of the result of extracting financial institution information of the embodiment;

FIG. 15 is a table illustrating an example of recognition result data of the embodiment;

FIG. 16 is a table illustrating complementing of a character string set of the embodiment;

FIGS. 17 to 22 are diagrams illustrating display examples of the embodiment;

FIG. 23 is a table illustrating an example of output data of the embodiment; and FIG. 24 is a table illustrating a modified example of an extraction process of the embodiment.

Figure 1:
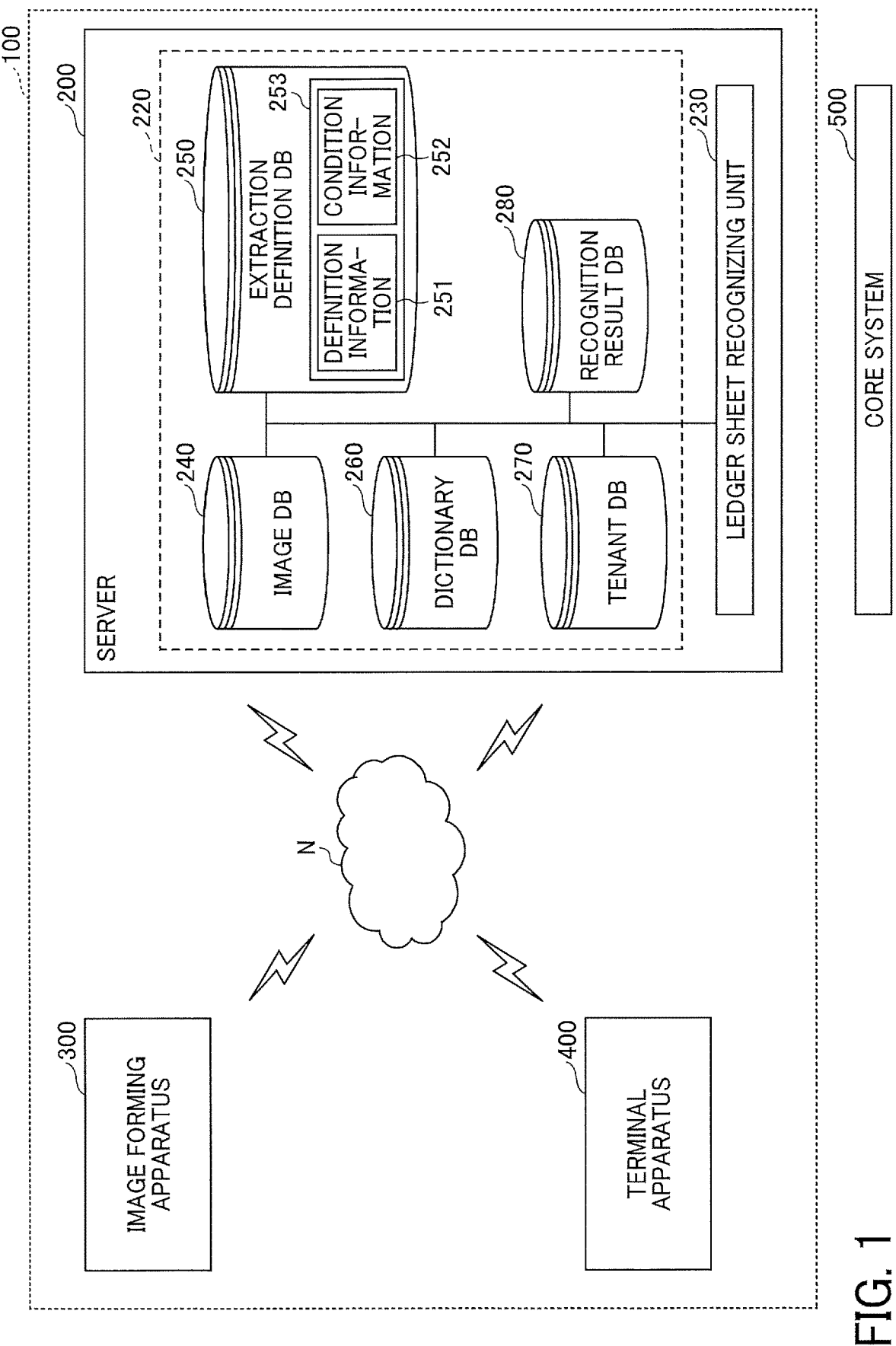
FIG. 1 is a diagram illustrating an example of the system configuration of a ledger sheet recognition system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

FIG. 1 is a diagram illustrating an example of the system configuration of a ledger sheet recognition system of the embodiment.

A ledger sheet recognition system 100 of the embodiment includes a server 200, an image forming apparatus 300, and a terminal apparatus 400, which are connected to each other via a network N. The ledger sheet recognition system 100 of the embodiment is an example of an information processing system.

The terminal apparatus 400 of the embodiment is connected to a core system 500 via the network N, for example. The core system 500 is a system that performs a particular process with a result of recognizing a ledger sheet in the ledger sheet recognition system 100 of the embodiment, for example.

In the embodiment, an invoice will be described as an example of the ledger sheet. Further, the following description will be given of an example in which the ledger sheet recognition system 100 extracts information including invoice information and financial institution information from a ledger sheet image read from the invoice. The invoice information represents the biller having issued the invoice and the billing amount. The financial institution information relates to a financial institution to which the billing amount is to be transferred.

Further, the core system 500 may be an accounting system that performs processes such as the transfer of the billing amount to the financial institution.

In the ledger sheet recognition system 100 of the embodiment, the server 200 extracts, from image data representing the image of the ledger sheet read by a scanner function of the image forming apparatus 300, items and the values of the items included in the ledger sheet, and generates text data associating the items with the values of the items.

In the following description, the image of the ledger sheet read by the scanner function of the image forming apparatus 300 will be described as the ledger sheet image, and the image data representing the ledger sheet image will be described as the ledger sheet image data.

Further, in the following description, extracting the names of the items (i.e., the item names) and the values of the items (i.e., the item values) from the ledger sheet image and converting the items and the values of the items into text data associating the items with the values of the items will be described as the ledger sheet recognition.

The server 200 of the embodiment includes a storage unit 220 and a ledger sheet recognizing unit 230. The storage unit 220 includes an image database (DB) 240, an extraction definition DB 250, a dictionary DB 260, a tenant DB 270, and a recognition result DB 280. The server 200 of the embodiment is an example of an information processing apparatus.

The image DB 240 stores the ledger sheet image data. The extraction definition DB 250 stores extraction definition information 253. The extraction definition information 253 is referred to by the ledger sheet recognizing unit 230 to extract, from the ledger sheet image, the character strings included in the financial institution information.

The dictionary DB 260 stores dictionary information for identifying the financial institution. The dictionary information has previously been acquired, and is referred to by the ledger sheet recognizing unit 230 to identify the name of the financial institution, for example.

The tenant DB 270 stores tenant information related to an organization (i.e., a tenant) using a service provided by the ledger sheet recognition system 100. The tenant is the billed party that receives the invoice, and the tenant information is information related to the billed party. The tenant DB 270 may be prepared for each tenant, for example. The tenant information in the tenant DB 270 has previously been registered in the server 200.

The recognition result DB 280 stores recognition result data, which is information representing the result of the ledger sheet recognition performed by the ledger sheet recognizing unit 230.

The ledger sheet recognizing unit 230 of the embodiment acquires the ledger sheet image data stored in the image DB 240, and performs character recognition on the acquired ledger sheet image data to extract therefrom a set of character strings (hereinafter referred to as the character string set) included in the ledger sheet image. The ledger sheet recognizing unit 230 then extracts the invoice information from the character string set. Further, with reference to the extraction definition information 253 stored in the extraction definition DB 250, the ledger sheet recognizing unit 230 extracts, from the character string set, character strings to be included in the financial institution information.

The extraction definition information 253 of the embodiment includes definition information 251 and condition information 252. The definition information 251 represents the definitions of the character strings to be included in the financial institution information. The condition information 252 represents the conditions for extracting the character strings to be included in the financial institution information.

With reference to the definition information 251, the ledger sheet recognizing unit 230 identifies, in the character string set extracted through the character recognition, the character string corresponding to the name of the financial institution. Then, the ledger sheet recognizing unit 230 extracts the character string representing the name of the financial institution (i.e., a first character string) based on the relative positions of the first character string and the identified character string.

That is, the first character string is extracted with respect to the character string identified in the character string set extracted through the character recognition, i.e., with respect to the thus-identified character string as a reference point. In other words, the character string identified in the character string set extracted through the character recognition serves as an extraction reference point for extracting the first character string.

With reference to the condition information 252, the ledger sheet recognizing unit 230 further extracts another character string to be included in the financial institution information (i.e., a second character string) based on the relative positions of the second character string and the character string representing the name of the financial institution (i.e., the first character string).

That is, the second character string is extracted with respect to the first character string as a reference point. In other words, the first character string, which is identified based on the above-described extraction reference point, serves as the extraction reference point for extracting the second character string.

The ledger sheet recognizing unit 230 then generates the financial institution information by associating the first character string and the second character string extracted from the ledger sheet image data with each other.

Further, based on the character strings extracted with reference to the extraction definition information 253 and the dictionary information stored in the dictionary DB 260, the ledger sheet recognizing unit 230 confirms the name of the financial institution, for example.

The ledger sheet recognizing unit 230 then stores, in the recognition result DB 280, the recognition result data that associates the invoice information with the financial institution information. The ledger sheet recognizing unit 230 may further convert the recognition result data into the format compatible with the core system 500 and output the converted recognition result data to the core system 500.

In the embodiment, a plurality of character strings associated with the character string corresponding to the name of the financial institution are thus extracted through the character recognition in the ledger sheet recognition. That is, the embodiment enables the extraction of a plurality of character strings associated with a character string extracted from the ledger sheet image, thereby improving the accuracy of the ledger sheet recognition.

In the ledger sheet recognition system 100 of the embodiment, the image forming apparatus 300 is a multifunction peripheral (MFP) with a scanner function. The image forming apparatus 300 is installed with applications (i.e., application programs) for implementing functions such as the scanner function, a copier function, and a facsimile (FAX) function. When the application corresponding to a desired one of the functions is selected, the desired function is implemented.

The terminal apparatus 400 of the embodiment is used by a user (i.e., the tenant) of the ledger sheet recognition system 100. The terminal apparatus 400 may display the result of the ledger sheet recognition performed by the server 200.

In the embodiment, the tenant is a company or firm, for example, to which one or more individual users belong. More specifically, the tenant is a business establishment, company, firm, or organization, for example, which has a contract to use the service provided by the ledger sheet recognition system 100.

In the configuration example of FIG. 1, the server 200 includes five databases in the storage unit 220. The databases, however, are not limited to this example. The databases may be partially included in an external apparatus outside the server 200, or all of the databases may be included in the external apparatus.

Further, in the example of FIG. 1, the ledger sheet recognizing unit 230 is implemented by the server 200. However, the ledger sheet recognizing unit 230 is not necessarily implemented by the server 200, and may be implemented by a plurality of information processing apparatuses.

Further, in the example of FIG. 1, the ledger sheet recognition system 100 includes one image forming apparatus 300 and one terminal apparatus 400. The ledger sheet recognition system 100, however, may include a desired number of image forming apparatuses 300 and a desired number of terminal apparatuses 400.

A hardware configuration of the server 200 of the embodiment will be described with reference to FIG. 2.

Figure 2:
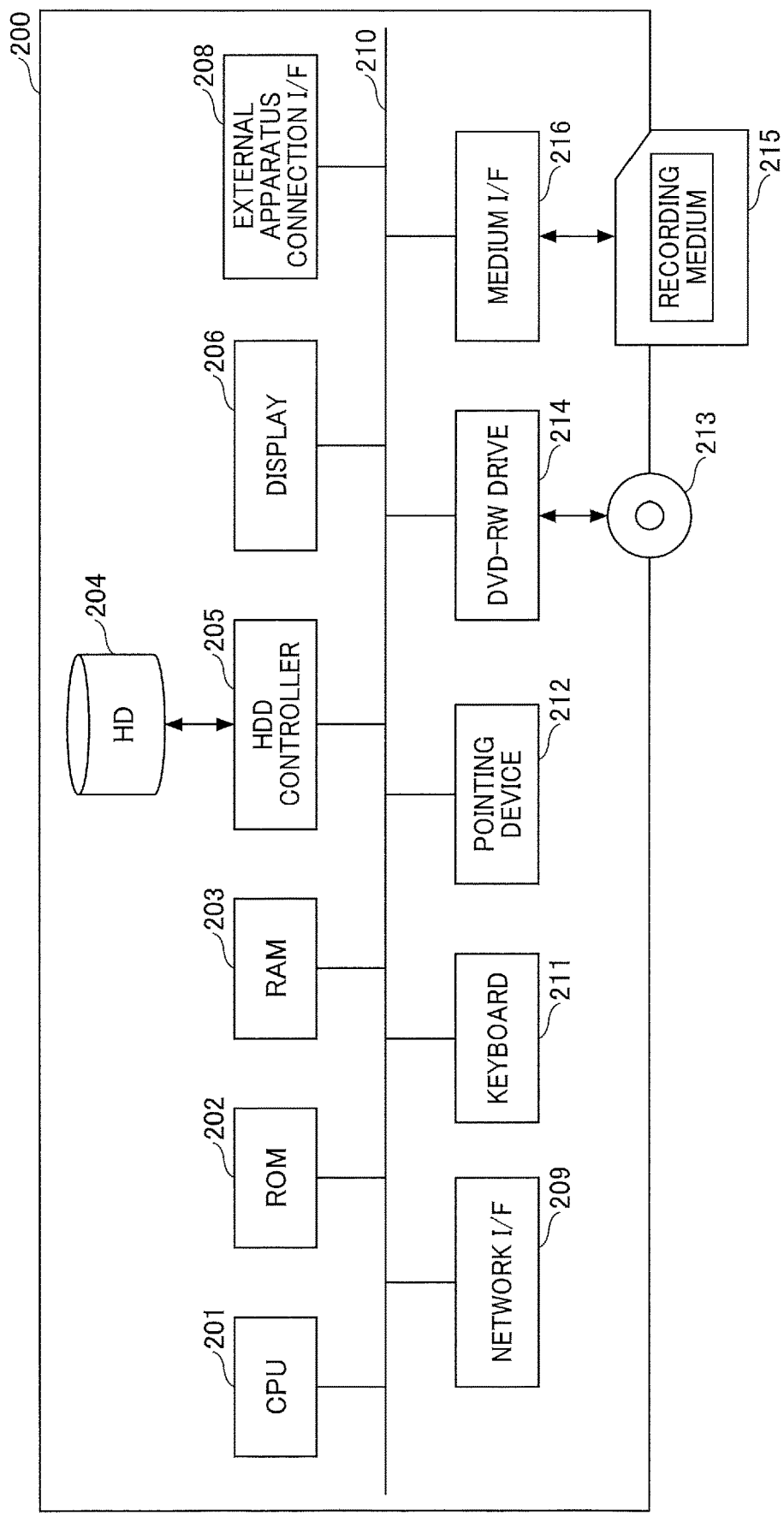
FIG. 2 is a diagram illustrating an example of the hardware configuration of a server included in the ledger sheet recognition system of the embodiment.

FIG. 2 is a diagram illustrating an example of the hardware configuration of the server 200. As illustrated in FIG. 2, the server 200, which is implemented by a computer, includes a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a bus line 210, a keyboard 211, a pointing device 212, a digital versatile disc-rewritable (DVD-RW) drive 214, and a medium I/F 216.

The CPU 201 controls the overall operation of the server 200. The ROM 202 stores a program used to drive the CPU 201, such as an initial program loader (IPL). The RAM 203 is used as a work area for the CPU 201. The HD 204 stores various data of programs, for example. The HDD controller 205 controls writing and reading of various data to and from the HD 204 under the control of the CPU 201. The display 206 displays various information such as a cursor, menus, windows, text, and images. The external apparatus connection I/F 208 is an interface for connecting the server 200 to various external apparatuses. The external apparatuses in this case include a universal serial bus (USB) memory and a printer, for example. The network I/F 209 is an interface for performing data communication via a communication network. The bus line 210 includes an address bus and a data bus for electrically connecting the CPU 201 and the other components in FIG. 2 to each other.

The keyboard 211 is an input device including a plurality of keys for inputting text, numerical values, and various instructions, for example. The pointing device 212 is an input device used to select and execute various instructions, select a processing target, and move the cursor, for example. The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium I/F 216 controls writing (i.e., storage) and reading of data to and from a recording medium 215 such as a flash memory.

The hardware configuration of the terminal apparatus 400 of the embodiment is similar to that of the sever 200, and thus description thereof will be omitted here. The terminal apparatus 400 may be a tablet terminal apparatus or a smartphone, for example. The terminal apparatus 400 may include a display and operation device implemented with a touch panel, for example, in place of the keyboard 211, the pointing device 212, and the display 206.

The extraction definition DB 250 included in the server 200 of the embodiment will be described with reference to FIGS. 3 and 4.

FIG. 3 is a table illustrating an example of the extraction definition DB 250. FIG. 3 illustrates an example of the definition information 251 included in the extraction definition information 253 stored in the extraction definition DB 250.

The definition information 251 includes information items "item name," "extraction reference point," "extraction direction," "extraction range," and "reference to dictionary." In the extraction definition DB 250, the information item "item name" is associated with the other information items. Information including the values of the information item "item name" and the values of the other information items forms the definition information 251.

Each of the values of the information item "item name" represents an item name associated with an item value, and is extracted based on the relative positions of the character string representing the value of the information item "item name" and the character string representing the value of the information item "extraction reference point" corresponding to the item name. That is, the value of the information item "item name" is the item name associated with the first character string or the second character string.

Further, the values of the information item "item name" are information items included in the financial institution information. The example of FIG. 3 includes "bank name," "branch name," "account type," "account number," and "account holder" as the values of the information item "item name." These values correspond to the information items of the financial institution information.

Each of the values of the information item "extraction reference point" is represented by the character string serving as the reference point in extracting the character string representing the item value of the item name represented by the value of the information item "item name."

Each of the values of the information item "extraction direction" represents the relative positions of the character string serving as the reference point and the character string representing the item value of the item name represented by the value of the information item "item name." That is, the value of the information item "extraction direction" represents the direction of the character string representing the item value of the item name represented by the value of the information item "item name" (i.e., the second character string) with respect to the previously extracted character string serving as the reference point (i.e., the first character string).

Each of the values of the information item "extraction range" represents the number of character strings to be extracted. Each of the values of the information item "reference to dictionary" indicates whether or not to perform a process of confirming the character string by referring to the dictionary information stored in the dictionary DB 260.

For example, in FIG. 3, the character string representing the item value of the item name "bank name" is located to the right of or below a particular character string such as "financial institution" or "payee," for example, in the character string set extracted from the ledger sheet image. Further, the number of character strings to be extracted is one, and the character string to be extracted is confirmed based on the dictionary DB 260. The character string serving as the extraction reference point for the item name "bank name" may be a character string partially matching the particular character string such as "financial institution" or "payee," for example.

Further, for example, the character string representing the item value of the item name "branch name" is located to the right of or below the character string serving as the extraction reference point, i.e., the character string extracted as the item value of the item name "bank name." Further, the number of character strings to be extracted is one, and the character string to be extracted is confirmed based on the dictionary DB 260.

In this case, therefore, the character string extracted as the item value corresponding to the item name "bank name" is the first character string, and the character string extracted as the item value corresponding to the item name "branch name" is the second character string.

Further, for example, the character string representing the item value of the item name "account type" is located to the right of, below, or to the left of the character string serving as the extraction reference point, i.e., the character string extracted as the item value of the item name "branch name." Further, the number of character strings to be extracted is two, and the character strings to be extracted are confirmed based on the dictionary DB 260.

In this case, the character string extracted as the item value corresponding to the item name "branch name" is the first character string, and the character string extracted as the item value corresponding to the item name "account type" is the second character string.

FIG. 4 is a table illustrating an example of the extraction definition DB 250. FIG. 4 illustrates the condition information 252 included in the extraction definition information 253.

The condition information 252 includes information items "branch name extraction condition," "account type extraction condition," and "account number extraction condition."

In the extraction definition DB 250, information including the values of the information items "branch name extraction condition," "account type extraction condition," and "account number extraction condition" forms the condition information 252.

The value of the information item "branch name extraction condition" represents the condition of the character string extracted as the item value of the item name "branch name." The value of the information item "account type extraction condition" represents the condition of the character string extracted as the item value of the item name "account type." The value of the information item "account number extraction condition" represents the condition of the character string extracted as the item value of the item name "account number."

In FIG. 4, the condition of the character string extracted as the item value of the item name "branch name" is set as that the character string should include characters "branch," "main branch," "office," "sales office," or "sales department," for example, at the end of the character string. Further, the condition of the character string extracted as the item value of the item name "account type" is set as that character string should include characters "saving" or "checking." Further, the condition of the character string extracted as the item value of the item name "account number" is set as that character string should include numbers.

The dictionary DB 260 will be described with reference to FIG. 5.

Figure 5:
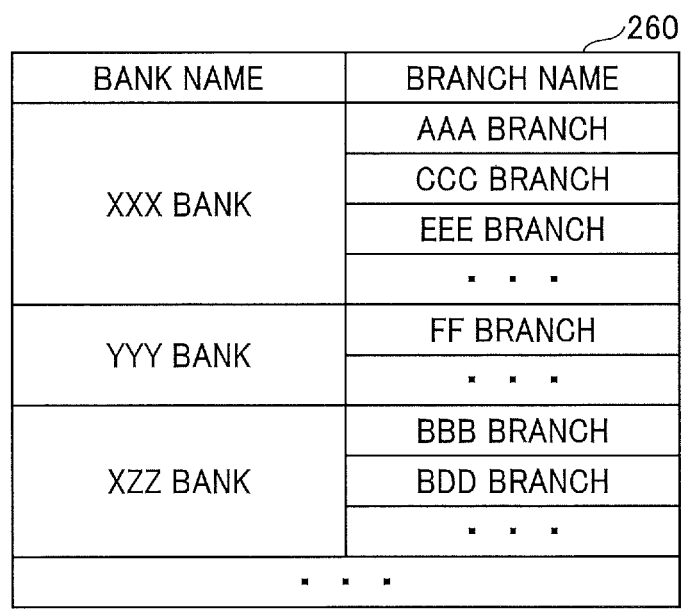
FIG. 5 is a table illustrating an example of a dictionary database in the server of the embodiment.

FIG. 5 is a table illustrating an example of the dictionary DB 260. The dictionary information stored in the dictionary DB 260 of the embodiment includes information items "bank name" and "branch name," which are associated with each other. In the embodiment, information associating the values of the information item "bank name" with the values of the information item "branch name" forms the dictionary information.

The example of FIG. 5 indicates that the bank with a bank name "XXX Bank" has branches with respective branch names "AAA Branch," "CCC Branch," and "EEE Branch."

The tenant DB 270 will be described with reference to FIG. 6.

FIG. 6 includes tables illustrating an example of the tenant DB 270. The tenant DB 270 of the embodiment may be prepared for each tenant. The tenant DB 270 includes information 271 related to the financial institution used by the tenant and information 272 of a client of the tenant.

The information 271 is account information of the billed party, and the information 272 is account information of the billing party (i.e., the biller). The tenant information of the embodiment includes the information 271 (i.e., the account information of the billed party) and the information 272 (i.e., the account information of the biller).

The information 271 includes information items "tenant name," "bank name," "branch name," "account type," "account number," "account holder," and "user selection." The information item "tenant name" is associated with the other information items. That is, the information item "tenant name" is associated with the financial institution information corresponding to the information item "tenant name" and the information item "user selection."

The value of the information item "tenant name" represents the name of the tenant. The value of the information item "tenant name" may be any information for identifying the tenant, such as a tenant identifier (ID) assigned to each tenant, for example.

The financial institution information associated with the value of the information item "tenant name" is information related to the financial institution used by the tenant identified by the tenant name. The value of the information item "user selection" indicates whether or not the corresponding account is specified as the source of payment for the billing amount.

The example of FIG. 6 indicates that a tenant with a tenant name "AA Corporation" has an account with an account type "saving" and an account number "1111111" in AAA Branch of ZZZ Bank, and that this account is selected as the source of payment.

The information 272 includes information items "tenant name," "biller," and "payee information." The value of the information item "biller" represents the name of the biller. The value of the information item "biller" may be any information for identifying the biller, such as a biller ID assigned to each biller.

The value of the information item "payee information" is information related to the financial institution specified by the biller identified by the value of the information item "biller." The value of the information item "payee information" includes, for example, "bank name (i.e., financial institution name)," " branch name," "account type," "account number," and "account holder" specified as the payee.

Functions of the server 200 will be described with reference to FIG. 7.

Figure 7:
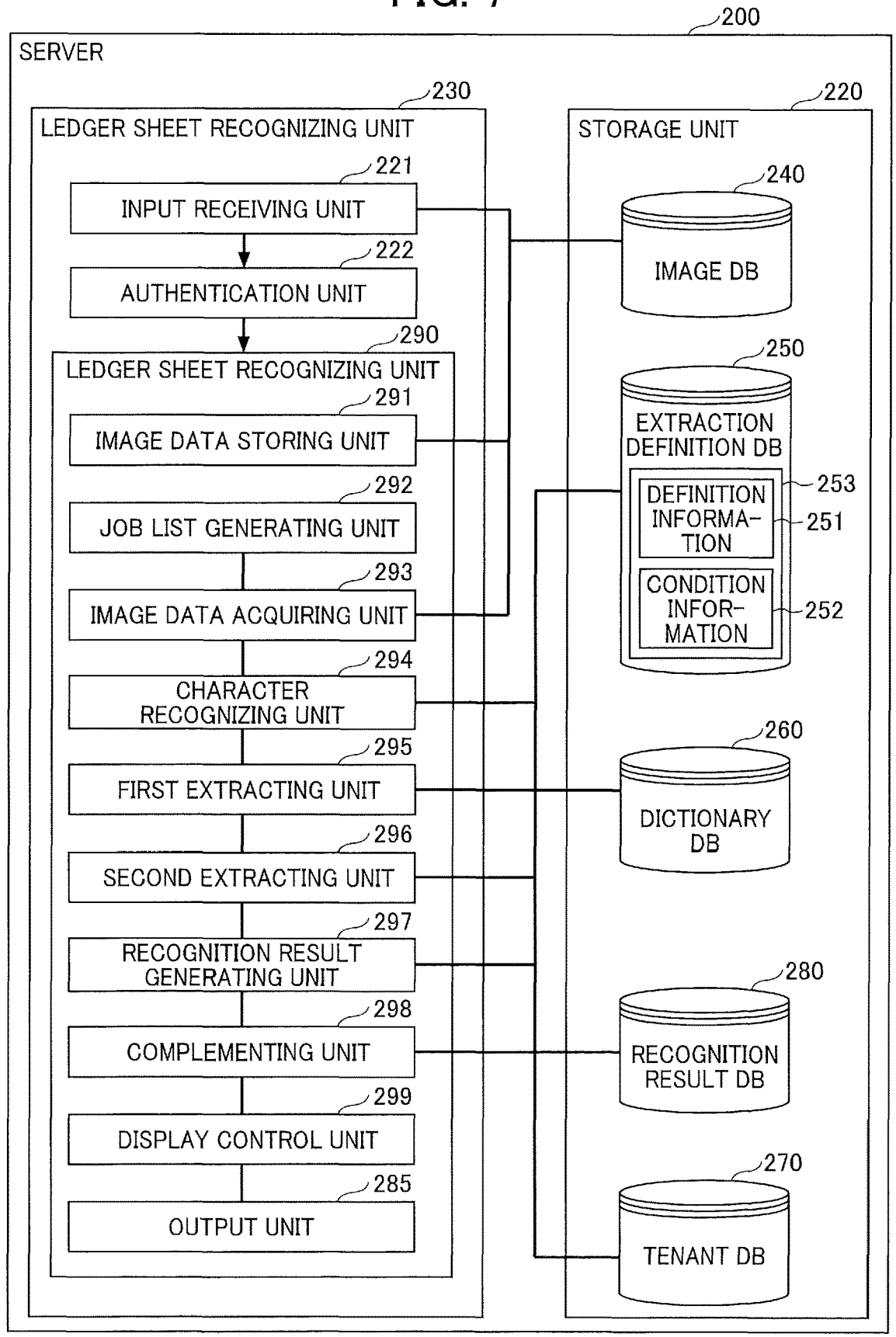
FIG. 7 is a diagram illustrating functions of the server of the embodiment.

FIG. 7 is a diagram illustrating functions of the server 200. In the server 200 of the embodiment, the CPU 201 reads and executes an information processing program stored in a memory such as the HD 204, for example, to thereby implement the functions of the units described below.

The server 200 of the embodiment includes the ledger sheet recognizing unit 230, which includes an input receiving unit 221, an authentication unit 222, and a ledger sheet recognizing unit 290.

The input receiving unit 221 receives a variety of inputs to the server 200. Specifically, the input receiving unit 221 receives input of authentication information for logging in to the ledger sheet recognition system 100. The authentication information includes a user ID and a password, for example. The input receiving unit 221 further receives input of the ledger sheet image data transmitted from the image forming apparatus 300, for example.

The authentication unit 222 performs authentication based on the authentication information input to the input receiving unit 221. For example, the authentication unit 222 may transmit the input authentication information to an authentication server disposed outside the server 200, and may acquire a result of authentication performed by the authentication server. If the user is authenticated, the authentication unit 222 may transmit the ledger sheet image data received by the input receiving unit 221 to the ledger sheet recognizing unit 290.

The ledger sheet recognizing unit 290 of the embodiment includes an image data storing unit 291, a job list generating unit 292, an image data acquiring unit 293, a character recognizing unit 294, a first extracting unit 295, a second extracting unit 296, a recognition result generating unit 297, a complementing unit 298, a display control unit 299, and an output unit 285.

In response to receipt of the ledger sheet image data from the image forming apparatus 300, the image data storing unit 291 stores the ledger sheet image data in the image DB 240.

When the input receiving unit 221 receives the input of the ledger sheet image data from the image forming apparatus 300, the job list generating unit 292 registers a job in a job list, and manages the job list. Details of the job list will be described later.

The image data acquiring unit 293 acquires the ledger sheet image data stored in the image DB 240.

The character recognizing unit 294 extracts, from the ledger sheet image data, character strings and information representing the location positions of the character strings, and holds the extracted character strings and information as reading result information. The reading result information therefore includes a plurality of character strings extracted from the ledger sheet image data. In the following description, the plurality of character strings extracted from the ledger sheet image data and included in the reading result information may be described as the character string set. Details of the reading result information will be described later.

The first extracting unit 295 extracts, from the reading result information, character strings representing information of the biller having issued the invoice and information of the billing amount, and determines the extracted information as invoice information. For example, the first extracting unit 295 may previously hold information representing the definitions of the character strings to be included in the invoice information, and may extract the character strings to be included in the invoice information based on this previously held information.

The second extracting unit 296 extracts the financial institution information with reference to the definition information 251 and the condition information 252 in the extraction definition DB 250. Details of the process of the second extracting unit 296 will be described later.

As described above, the first extracting unit 295 is an example of an invoice information extracting unit that extracts the invoice information from the ledger sheet image data, and the second extracting unit 296 is an example of a financial institution information extracting unit that extracts the financial institution information from the ledger sheet image data.

The recognition result generating unit 297 generates the recognition result data in which the invoice information extracted by the first extracting unit 295 and the financial institution information extracted by the second extracting unit 296 are associated with each other.

The complementing unit 298 compares the character string set included in the reading result information with the dictionary information stored in the dictionary DB 260, and associates each of the character strings included in the character string set with a complementing result. In the following description, the reading result information subjected to the complementing process by the complementing unit 298 will be described as the complemented reading result information.

The display control unit 299 controls the display of a screen of the terminal apparatus 400, for example. Specifically, the display control unit 299 may generate screen data representing a recognition result check screen to be displayed on the terminal apparatus 400.

The output unit 285 outputs the screen data generated by the display control unit 299 to represent the recognition result check screen to the terminal apparatus 400. That is, the output unit 285 causes the terminal apparatus 400 to display, on a World Wide Web (web) browser on a display of the terminal apparatus 400, the recognition result check screen generated by the display control unit 299. The output unit 285 further converts the recognition result data into the format compatible with the core system 500, and outputs the converted recognition result data to the core system 500.

An operation of the ledger sheet recognition system 100 of the embodiment will be described below with reference to FIGS. 8A and 8B.

Figure 8B:
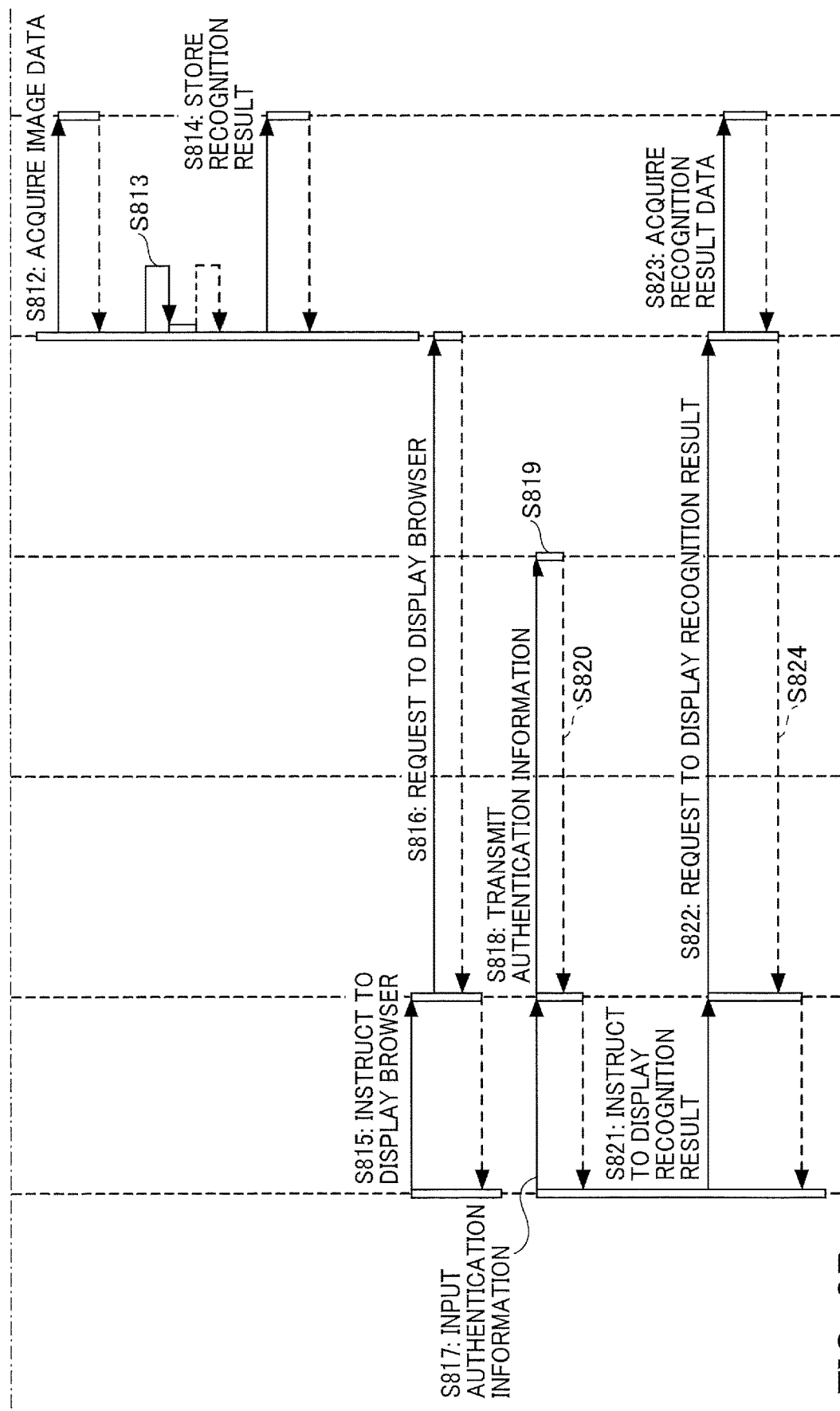

FIGS. 8A and 8B are a sequence diagram illustrating an operation of the ledger sheet recognition system 100. In the ledger sheet recognition system 100, the image forming apparatus 300 receives a request from the user to start an application for executing the ledger sheet recognition (step S801), and starts the application (step S802). Herein, the user is a user who operates as an administrator of the tenant, for example. However, any user who belongs to the tenant may be operated as a user.

The image forming apparatus 300 then receives input of authentication information from the user (step S803), and transmits the authentication information to the server 200 to request authentication (step S804).

In response to receipt of the authentication request, the server 200 performs the authentication with the authentication unit 222, and transmits a result of the authentication to the image forming apparatus 300 (step S805). The processes described below are performed when the user is authenticated.

The image forming apparatus 300 then receives an instruction to scan the ledger sheet (step S806), and scans the ledger sheet to acquire the ledger sheet image data (step S807). The image forming apparatus 300 then transmits the ledger sheet image data to the server 200 (step S808).

In the server 200, the input receiving unit 221 receives the input of the ledger sheet image data, and the authentication unit 222 transmits the ledger sheet image data to the ledger sheet recognizing unit 290 (step S809). In the example of FIG. 8A, the ledger sheet image data is transmitted to the ledger sheet recognizing unit 290 via the authentication unit 222. However, the transmission of the ledger sheet image data is not limited thereto. The ledger sheet image data may be transmitted to the ledger sheet recognizing unit 290 without via the authentication unit 222.

In the ledger sheet recognizing unit 290 of the server 200, in response to receipt of the ledger sheet image data, the job list generating unit 292 registers a job in the job list (step S810). Then, in the ledger sheet recognizing unit 290, the image data storing unit 291 stores the ledger sheet image data in the image DB 240 (step S811).

Then, with the image data acquiring unit 293, the ledger sheet recognizing unit 290 acquires the ledger sheet image data to be recognized from the image DB 240 (step S812).

The ledger sheet recognizing unit 290 then executes the process of recognizing the ledger sheet image (step S813).

Specifically, in the ledger sheet recognizing unit 290 of the embodiment, the first extracting unit 295 extracts the invoice information from the character string set included in the reading result information, and the second extracting unit 296 extracts the financial institution information from the character string set. Then, the recognition result generating unit 297 generates the recognition result data associating the invoice information with the financial institution information.

Further, in the ledger sheet recognizing unit 290, the complementing unit 298 generates the complemented reading result information by complementing the character string set in the reading result information based on the dictionary DB 260. Details of the process of step S813 will be described later.

Then, the ledger sheet recognizing unit 290 stores the recognition result data generated by the recognition result generating unit 297 in the recognition result DB 280 (step S814).

In the ledger sheet recognition system 100, the terminal apparatus 400 receives input of a browser display instruction from the user (step S815), and transmits a browser display request to the server 200 to display the browser for displaying the recognition result data (step S816).

Further, the terminal apparatus 400 receives input of authentication information from the user (step S817), and transmits the authentication information to the server 200 (step S818).

With the authentication unit 222, the server 200 performs the authentication of the user (step S819), and transmits a result of the authentication to the terminal apparatus 400 (step S820). The processes described here are performed when the user is authenticated.

Then, the terminal apparatus 400 receives input of an instruction from the user to display the recognition result of the ledger sheet image (step S821), and transmits a request to display the recognition result to the server 200 (step S822).

In response to receipt of the display request, the server 200 acquires the recognition result data from the recognition result DB 280 (step S823). The server 200 then generates the recognition result check screen, and causes the terminal apparatus 400 to display the recognition result check screen on the browser of the terminal apparatus 400 (step S824), to thereby enable the user to check the recognition result on the displayed recognition result check screen. Then, the operation of the ledger sheet recognition system 100 is completed.

The job list generated by the job list generating unit 292 of the embodiment will be described with reference to FIG. 9.

FIG. 9 is a table illustrating an example of the job list. In the server 200 of the embodiment, in response to receipt of the ledger sheet image data input from the image forming apparatus 300, the job list generating unit 292 holds the ledger sheet image data and a job ID associated therewith as a job list.

A job list 91 of the embodiment includes information items "job ID," "tenant ID," "ledger sheet image file path," "recognition result file path," and "status." The job list 91 may additionally include "definition ID" as an item. Further, the tenant ID may be replaced with the user ID, as the user ID identifies a user who belongs to a tenant such as an organization. Alternatively, at least a part of the user ID and at least a part of the tenant ID may be used in combination.

The value of the information item "job ID" is an identifier for identifying the job, i.e., an identifier for identifying the ledger sheet image data received from the image forming apparatus 300.

The value of the information item "tenant ID" is an identifier for identifying the tenant to which the user who has logged in to the ledger sheet recognition system 100 belongs. Instead, the tenant ID may be replaced by the user ID of the user who has logged in.

The value of the information item "ledger sheet image file path" is information representing the storage location of the ledger sheet image data.

The value of the information item "recognition result file path" is information representing the storage location of the recognition result data representing the recognition result of the ledger sheet image.

The value of the information item "status" represents the progress of the recognition of the ledger sheet image. That is, the value of the information item "status" represents the state of the job.

In the embodiment, the value of the information item "status" is one of four statuses: unprocessed, saved as draft, confirmed, and externally output, which are defined as follows.

The unprocessed status (a first status) is a state immediately after the acquisition of the recognition result data through the ledger sheet recognition. In this state, operations such as checking the recognition result data have not been executed.

The saved-as-draft status (a second status) is a state in which the operations such as checking the recognition result data are ongoing and the recognition result data has not been confirmed.

The confirmed status (a third status) is a state in which the operations such as checking the recognition result data have been completed and the recognition result data has been stored in the recognition result DB 280 as confirmed information.

The externally output status (a fourth status) is a state in which the recognition result data has been output to the core system 500, such as an accounting system, which cooperates with the ledger sheet recognition system 100.

In the server 200 of the embodiment, in response to receipt of the ledger sheet image data from the image forming apparatus 300, the job list generating unit 292 assigns a job ID to the ledger sheet image data, and adds a record of the ledger sheet image data to the job list 91 in association with the user ID (or tenant ID) acquired as the authentication information. When the ledger sheet image data is stored in the image DB 240, the job list generating unit 292 adds the information of the storage location of the ledger sheet image data to the job list 91 as the value of the information item "ledger sheet image file path."

Further, when ledger sheet definition information to be referred to is identified in the recognition of the ledger sheet image, the job list generating unit 292 adds a definition ID of the ledger sheet definition information to the job list 91 as the value of an information item "definition ID." Then, when the job list 91 is completed and the recognition result data is stored in the recognition result DB 280, the job list generating unit 292 adds the information of the storage location of the recognition result data to the job list 91 as the value of the information item "recognition result file path," and sets the value of the information item "status" to "confirmed."

In the embodiment, the job list 91 generated by the job list generating unit 292 may be displayed, for example. In this case, the user is able to check the progress of the recognition of the ledger sheet image via a job list screen displayed based on the job list 91.

Processes of the ledger sheet recognizing unit 290 of the embodiment will be described with reference to FIGS. 10 to 12.

Figure 10:
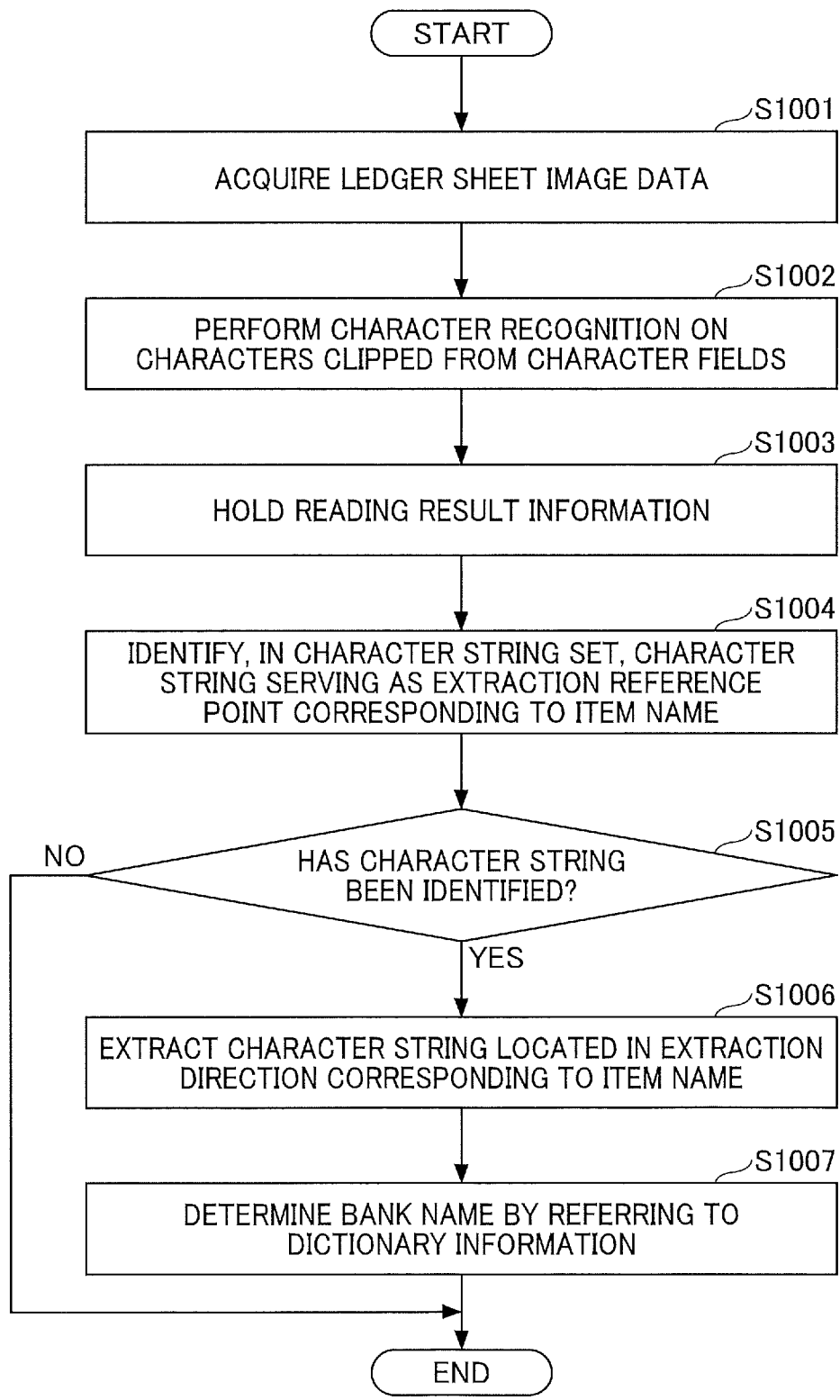

FIG. 10 is a flowchart illustrating a process of the ledger sheet recognizing unit 290. FIG. 10 illustrates details of the process of step S813 in FIG. 8B. More specifically, FIG. 10 illustrates a process of extracting the character string representing the item value of the item name "bank name" in the financial institution information.

In the ledger sheet recognizing unit 290 of the embodiment, the image data acquiring unit 293 acquires the ledger sheet image data from the image DB 240 (step S1001).

Then, in the ledger sheet recognizing unit 290, the character recognizing unit 294 clips character fields from the ledger sheet image, clips characters from the clipped character fields, and performs character recognition on the clipped characters (step S1002). The character fields are the areas in which the characters are formed. In this step, the character recognizing unit 294 further acquires the coordinates representing the respective positions of the clipped characters.

Then, the ledger sheet recognizing unit 290 generates the reading result information based on the relative positions of the characters recognized by the character recognizing unit 294, and holds the generated reading result information (step S1003). Specifically, based on the coordinates of the recognized characters, the ledger sheet recognizing unit 290 recognizes characters separated from each other by a distance equal to or less than a preset threshold value as one character string. Then, the ledger sheet recognizing unit 290 generates the reading result information by associating the character string with information such as the coordinates representing the position of the area in which the character string is formed. Details of the reading result information will be described later.

Then, in the ledger sheet recognizing unit 290, the second extracting unit 296 identifies, in the character string set included in the reading result information, the character string matching the character string determined as the extraction reference point corresponding to the item name "bank name" in the definition information 251 (step S1004). If there is no character string matching the character string determined as the extraction reference point corresponding to the item name "bank name," the second extracting unit 296 may identify the character string partially matching the character string determined as the extraction reference point. That is, the second extracting unit 296 identifies the character string serving as the reference point for extracting the item value of the item name "bank name."

The second extracting unit 296 then determines whether the character string serving as the extraction reference point corresponding to the item name "bank name" has been identified at step S1004 (step S1005).

If it is determined at step S1005 that the character string serving as the extraction reference point corresponding to the item name "bank name" has not been identified (NO at step S1005), the second extracting unit 296 completes the process of extracting the item value of the item name "bank name."

If it is determined at step S1005 that the character string serving as the extraction reference point corresponding to the item name "bank name" has been identified (YES at step S1005), the second extracting unit 296 extracts, from the character string set included in the reading result information, the character string located in the extraction direction corresponding to the item name "bank name" in the definition information 251 (step S1006). The character string extracted in this step represents the item value of the item name "bank name."

The second extracting unit 296 then determines the item value of the item name "bank name" by comparing the dictionary information stored in the dictionary DB 260 with the character string extracted at step S1006 (step S1007). Then, the process of extracting the item value of the item name "bank name" is completed.

In the embodiment, the process by the first extracting unit 295 to extract the invoice information from the ledger sheet image data may precede or follow the process by the second extracting unit 296 to extract the financial institution information from the ledger sheet image data.

In the example of FIG. 10, the second extracting unit 296 determines the item value of the item name "bank name" at step S1007 with reference to the dictionary information stored in the dictionary DB 260. Alternatively, the second extracting unit 296 may determine the item value without reference to the dictionary DB 260.

Figure 11:
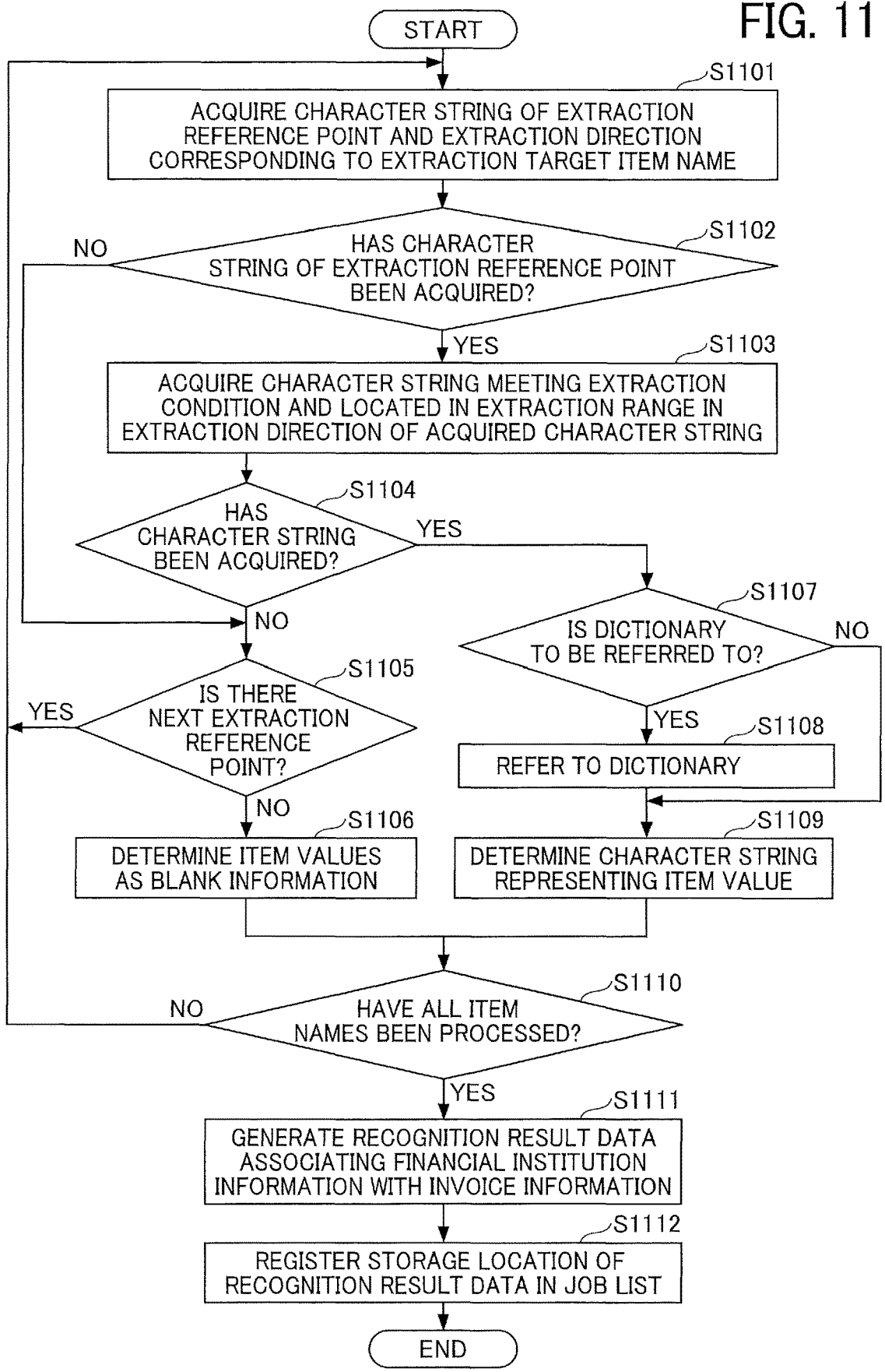

FIG. 11 is a flowchart illustrating another process of the ledger sheet recognizing unit 290. FIG. 11 illustrates a process of extracting the character string representing the item value of the item name following the item name "ban name" in the financial institution information.

In the ledger sheet recognizing unit 290 of the embodiment, with reference to the definition information 251, the second extracting unit 296 acquires the character string serving as the extraction reference point corresponding to the item name for which the item value is to be extracted (i.e., the extraction target item name) The second extracting unit 296 further acquires the extraction direction for extracting the item value of the extraction target item name (step S1101).

The second extracting unit 296 then determines whether the character string serving as the extraction reference point has been acquired (step S1102). If it is determined at step S1102 that the character string serving as the extraction reference point has not been acquired (NO at step S1102), the second extracting unit 296 proceeds to the process of step S1105, which will be described later.

If it is determined at step S1102 that the character string serving as the extraction reference point has been acquired (YES at step S1102), the second extracting unit 296 acquires, with reference to the definition information 251, the character string that is located within the extraction range in the extraction direction corresponding to the acquired character string and meets the condition information 252 (step S1103).

The second extracting unit 296 then determines whether the character string has been acquired at step S1103 (step S1104). If it is determined at step S1104 that the character string has been acquired (YES at step S1104), the second extracting unit 296 proceeds to the process of step S1107, which will be described later.

If it is determined at step S1104 that the character string has not been acquired (NO at step S1104), the second extracting unit 296 determines whether there is a character string serving as the next extraction reference point (step S1105).

If it is determined at step S1105 that there is a character string serving as the next extraction reference point (YES at step S1105), the second extracting unit 296 returns to the process of step S1101.

If it is determined at step S1105 that there is no character string serving as the next extraction reference point (NO at step S1105), the second extracting unit 296 determines the item values of the item names in the definition information 251 as blank information (step S1106), and proceeds to the process of step S1110, which will be described later. In the embodiment, therefore, if the item value of the item name "bank name" is not extracted, the item values of all item names in the financial institution information are left blank.

If it is determined at step S1104 that the character string has been acquired (YES at step S1104), the second extracting unit 296 determines, with reference to the value of the information item "reference to dictionary" in the definition information 251, whether the dictionary DB 260 is to be referred to (step S1107).

If it is determined at step S1107 that the dictionary DB 260 is not to be referred to (NO at step S1107), the second extracting unit 296 proceeds to the process of step S1109, which will be described later.

If it is determined at step S1107 that the dictionary DB 260 is to be referred to (YES at step S1107), the second extracting unit 296 refers to the dictionary DB 260 and compares the extracted character string with the dictionary information in the dictionary DB 260 (step S1108).

The second extracting unit 296 then determines the character string representing the item value of the item name (step S1109).

Then, the second extracting unit 296 determines whether all item names included in the definition information 251 have been associated with the respective item values (step S1110). If it is determined at step S1110 that the definition information 251 includes an item name not associated with an item value (NO at step S1110), the second extracting unit 296 returns to the process of step S1101.

If it is determined at step S1110 that all item names in the definition information 251 have been associated with the respective item values (YES at step S1110), the recognition result generating unit 297 of the ledger sheet recognizing unit 290 generates the recognition result data associating the financial institution information with the invoice information (Step S1111).

Then, the job list generating unit 292 of the ledger sheet recognizing unit 290 registers the storage location of the recognition result data in the job list 91 (step S1112), and the process of FIG. 11 is completed.

As described above, the second extracting unit 296 of the embodiment repeats the process of determining the character string extracted based on the relative positions of the character string and the character string serving as the extraction reference point as the next extraction reference point. Then, the second extracting unit 296 of the embodiment determines the character string extracted based on the relative positions of the character string and the character string serving as the extraction reference point as the item value of the item name corresponding to the character string serving as the extraction reference point.

FIG. 12 is a flowchart illustrating another process of the ledger sheet recognizing unit 290. FIG. 12 illustrates a process of the complementing unit 298 of the ledger sheet recognizing unit 290.

In response to generation of the recognition result data, the ledger sheet recognizing unit 290 of the embodiment starts a complementing process with the complementing unit 298 (step S1201) to execute the processes of step 1202 and the subsequent steps on all character strings of the character string set included in the reading result information.

The complementing unit 298 selects a certain character string from the character string set (step S1202). The complementing unit 298 then identifies the bank name corresponding to the selected character string with reference to the dictionary information stored in the dictionary DB 260, and registers the identified bank name in the reading result information in association with the selected character string (step S1203).

The bank name corresponding to the selected character string may completely or partially match the selected character string. Further, if the dictionary information does not include the bank name completely or partially match the selected character string, the complementing unit 298 may identify the bank name presumed to be closest to the selected character string, and may associate the thus-identified bank name with the selected character string.

Then, with reference to the dictionary information, the complementing unit 298 identifies the branch name corresponding to the selected character string among the branch names corresponding to the bank name associated with a character string other than the selected character string, and registers the identified branch name in association with the selected character string (step S1204).

The complementing unit 298 holds the result of the processes of steps S1201 to S1204 performed on all character strings of the character string set in the reading result information as the complemented reading result information (step S1205). Then, the process of FIG. 12 is completed.

The process of the ledger sheet recognizing unit 290 will be specifically described with reference to FIGS. 13A and 13B and FIGS. 14 to 16.

FIGS. 13A and 13B are tables illustrating the character recognition. Information 131 illustrated in FIG. 13A is a result of character recognition performed on the ledger sheet image data by the character recognizing unit 294.

The information 131 is an example of information extracted from the recognition result of the characters in the clipped character fields and the coordinates representing the positions of the characters.

The character recognizing unit 294 of the embodiment connects neighboring characters in the information 131 to recognize a character string. Specifically, the character recognizing unit 294 may recognize one word as a combination of characters separated from each other by a distance equal to or less than the length of a predetermined number of pixels.

Information 132 illustrated in FIG. 13B represents the character strings recognized by the character recognizing unit 294 and the areas of the character strings. That is, the information 132 is the reading result information obtained from the ledger sheet image by the character recognizing unit 294.

The character recognizing unit 294 further recognizes each of areas in the ledger sheet image data divided by vertical lines and horizontal lines as a cell, and assigns, to the cell, identification information for identifying the cell (i.e., a cell ID).

The information 132 illustrated in FIG. 13B represents the association between the areas recognized as the cells in the ledger sheet image and the respective cell IDs.

For example, in the information 132 of FIG. 13B, the area in which a character string "payee" is recognized is identified based on the height and width of the character string with respect to a position represented by the X-coordinate and the Y-coordinate.

The information 132 also indicates that the area in which the character string "payee" is recognized corresponds to a cell with a cell ID "17." The character string "payee" is therefore associated with the cell ID "17" as a character string included in the reading result information.

The ledger sheet recognizing unit 290 of the embodiment thus associates the character strings and the cells in the ledger sheet image data with each other.

FIG. 14 is a table illustrating an example of the result of extracting the financial institution information. With the process of FIG. 10, the second extracting unit 296 of the embodiment first extracts the information item "bank name" among the information items included in the financial institution information.

Specifically, with reference to the definition information 251, the second extracting unit 296 identifies, in the character string set included in the reading result information, the character string serving as the extraction reference point corresponding to the initial item name "bank name." The second extracting unit 296 then identifies the character string representing the item value of the item name "bank name" based on the relative positions of the character string representing the item value of the item name "bank name" and the character string identified as the extraction reference point (i.e., the first character string), based on the relative positions thereof specified by the definition information 251.

According to the definition information 251, the item name "bank name" corresponds to the character string located to the right of or below the character string serving as the extraction reference point (see FIG. 3).

Herein, if the character string "payee" is identified in the character string set included in the reading result information, for example, the second extracting unit 296 determines that the character string located to the right of or below the character string "payee" serving as the extraction reference point represents the item value of the item name "bank name."

If a plurality of extraction directions are defined in the definition information 251, the second extracting unit 296 sequentially determines, for each of the defined extraction directions, the presence or absence of a character string located in the extraction direction, starting from the initially defined one of the extraction directions.

The example of FIG. 14 indicates that a character string "XXX Bank" has been identified as the item value of the item name "bank name."

Herein, even if the bank name represented by the character string identified as the item value of the item name "bank name" through the character recognition is incorrect, for example, the second extracting unit 296 compares the bank name with the dictionary information and determines the character string partially matching the identified character string as the character string representing the bank name.

Then, with reference to the definition information 251, the second extracting unit 296 identifies the character string serving as the extraction reference point corresponding to the next item name "branch name." In the definition information 251, the character string serving as the extraction reference point corresponding to the item name "branch name" is the character string representing the extracted bank name. In this case, therefore, "XXX Bank" is the character string serving as the extraction reference point.

Since the extraction directions corresponding to the item name "branch name" are right and down (see FIG. 3), the second extracting unit 296 first determines the presence or absence of a character string located to the right of the character string "XXX Bank." Then, if there is a character string located to the right of the character string "XXX Bank," the second extracting unit 296 determines this character string as the item value of the item name "branch name."

If there is no character string located to the right of the character string "XXX Bank," the second extracting unit 296 determines the presence or absence of a character string located below the character string "XXX Bank." Then, if there is a character string located below the character string "XXX Bank," the second extracting unit 296 determines this character string as the item value of the item name "branch name."

The second extracting unit 296 performs the above-described process on all item names included in the financial institution information. Consequently, information associating the item names with the respective item values is extracted as financial institution information 141.

FIG. 15 is a table illustrating an example of the recognition result data. The recognition result data of the embodiment includes the financial institution information 141 extracted by the second extracting unit 296 and invoice information 151 extracted by the first extracting unit 295.

The invoice information 151 includes information items "invoice number," "issuer (i.e., biller) of the invoice," "date of invoice," and "billing amount," for example, to identify the invoice.

FIG. 16 is a table illustrating complementing of the character string set. Information 132A illustrated in FIG. 16 is an example of the complemented reading result information.

In the information 132A, each of the character strings of the character string set included in the reading result information is associated with a bank name identified based on the dictionary information. Further, in the information 132A, each of the character strings of the character string set included in the reading result information is associated with a branch name closest to the each of the character strings among the branch names corresponding to the bank name associated with a character string other than the each of the character strings.

With the above-described complementing process of the embodiment, if a certain character string is incorrectly extracted as a bank name from the character string set included in the reading result information, for example, the incorrectly extracted character string is replaced with the bank name registered through the complementing process.

A display example of the embodiment will be described with reference to FIGS. 17 to 22.

FIG. 17 is a diagram illustrating a display example. A screen 301 illustrated in FIG. 17 may be displayed on the terminal apparatus 400, for example. The screen 301 is an example of the recognition result check screen displayed on the browser of the terminal apparatus 400 at step S824 in FIG. 8B.

The screen 301 includes display fields 302 and 303 and operation buttons 307 and 308. The display field 302 displays the ledger sheet image represented by the ledger sheet image data. In the example of FIG. 17, the ledger sheet is an invoice, and the ledger sheet image includes an area 310 displaying the financial institution information. The area in the ledger sheet image displaying the financial institution information is not limited to the area 310. Specifically, for example, the area in the ledger sheet image displaying the financial institution information may be an area 310A. The display field 302 in FIG. 17 displays one of the areas 310 and 310A.

The display field 303 displays the recognition result data obtained through the ledger sheet recognition performed by the ledger sheet recognizing unit 290 on the ledger sheet image data representing the ledger sheet image displayed in the display field 302.

The display field 303 includes display fields 304, 305, and 306. The display field 303 displays the invoice information 151 (see FIG. 15). The invoice information is a part of the recognition result data. The display field 305 displays the financial institution information 141 (see FIGS. 14 and 15). The display field 306 displays the value of the information item "status" in the job list 91.

The display field 305 displays the item names and the item values of the financial institution information 141 in association with each other.

In the example of FIG. 17, the display field 305 includes display fields 321, 322, and 323, for example. The display field 321 displays the item value of the item name "bank name." The display field 322 displays the item value of the item name "branch name." The display field 323 displays the item value of the item name "account type."

The display field 321 includes a display component 321a for editing the contents displayed in the display field 321. The display field 322 includes a display component 322a for editing the contents displayed in the display field 322. The display field 323 includes a display component 323a for editing the contents displayed in the display field 323.

In the embodiment, in response to receipt of an operation of selecting a certain display component in a certain display field, the contents displayed in the certain display field become editable. Details of the editing of the contents displayed in the display field will be described later.

The operation button 307 is operated to change the value of the status in the job list 91 (see FIG. 9) from the unprocessed status to the saved-as-draft status. When the operation button 307 is operated, the display in the display field 306 is changed to "saved as draft" from "unprocessed."

The operation button 308 is operated to change the value of the status in the job list 91 to the confirmed status. In the embodiment, when the operation button 308 is operated, the value of the status in the job list 91 is changed to the confirmed status. In the embodiment, the recognition result data in the confirmed status may be converted into the format comparable with the core system 500 by the output unit 285.

The editing of the contents displayed in the display field 321 will be described with reference to FIG. 18.

Figure 18:
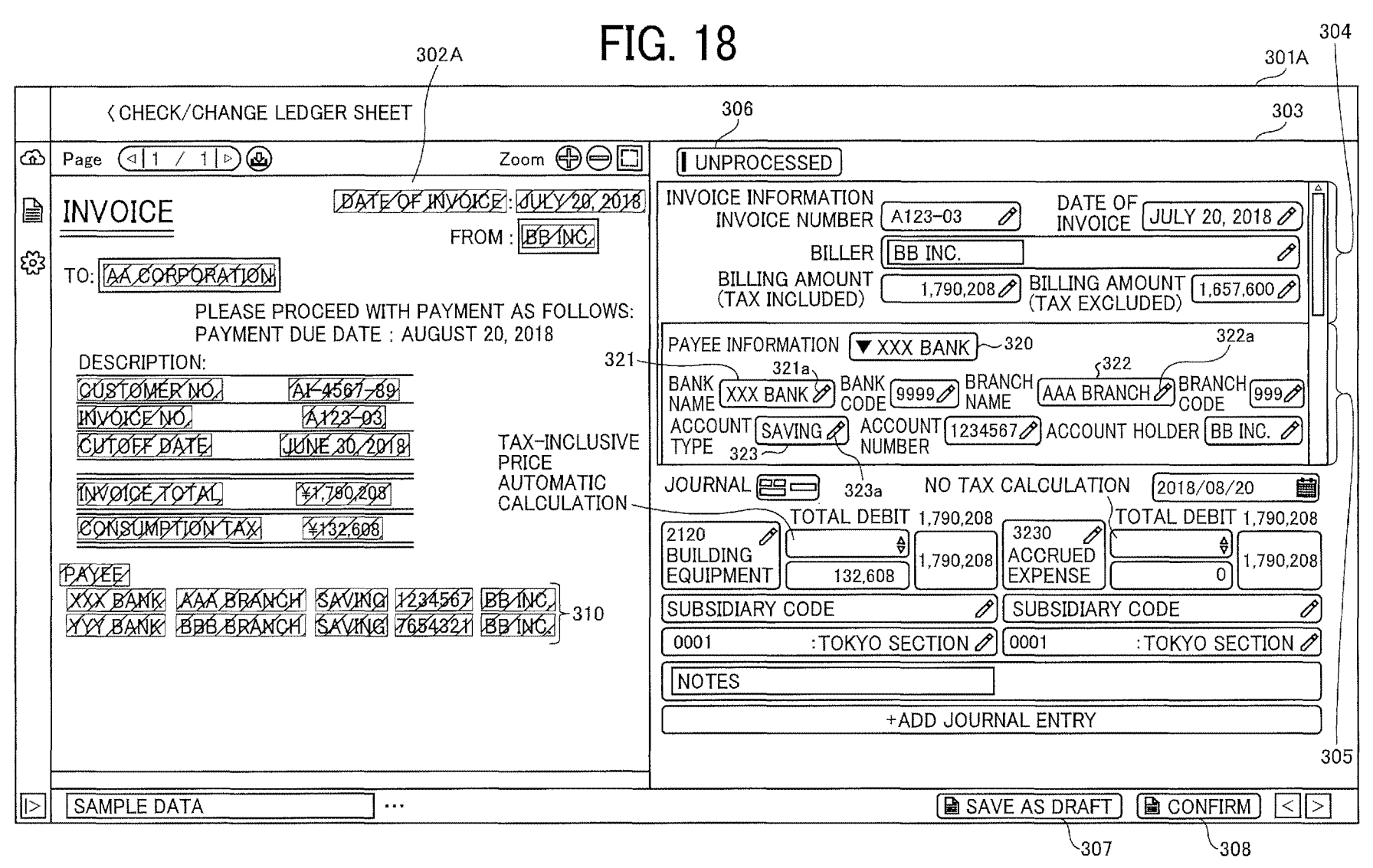

FIG. 18 is a diagram illustrating another display example. The display field 321 displays the item value of the item name "bank name," for example. In the example described here, the contents displayed in the display field 321 are edited.

In response to receipt of the selection of the display component 321a on a screen 301A, the server 200 displays all character strings in the ledger sheet image in highlight, as in a display field 302A. Then; in response to receipt of the selection of a certain character string in the ledger sheet image displayed in the display field 302A, the server 200 displays the selected character string in the display field 321.

In the example of FIG. 18, the character string "XXX Bank" is selected in the display field 302A. The display field 321 therefore displays the character string "XXX Bank."

In the embodiment, when the display component 321a is selected, the character strings included in the ledger sheet image are displayed in highlight. However, the display mode of the character strings in the ledger sheet image is not limited to the highlight mode, and may be any display mode different from that applied when the contents displayed in the display fields are not edited. For example, rectangular frames enclosing the character strings may be displayed.

The editing of the contents displayed in the display field 322 will be described with reference to FIG. 19.

Figure 19:
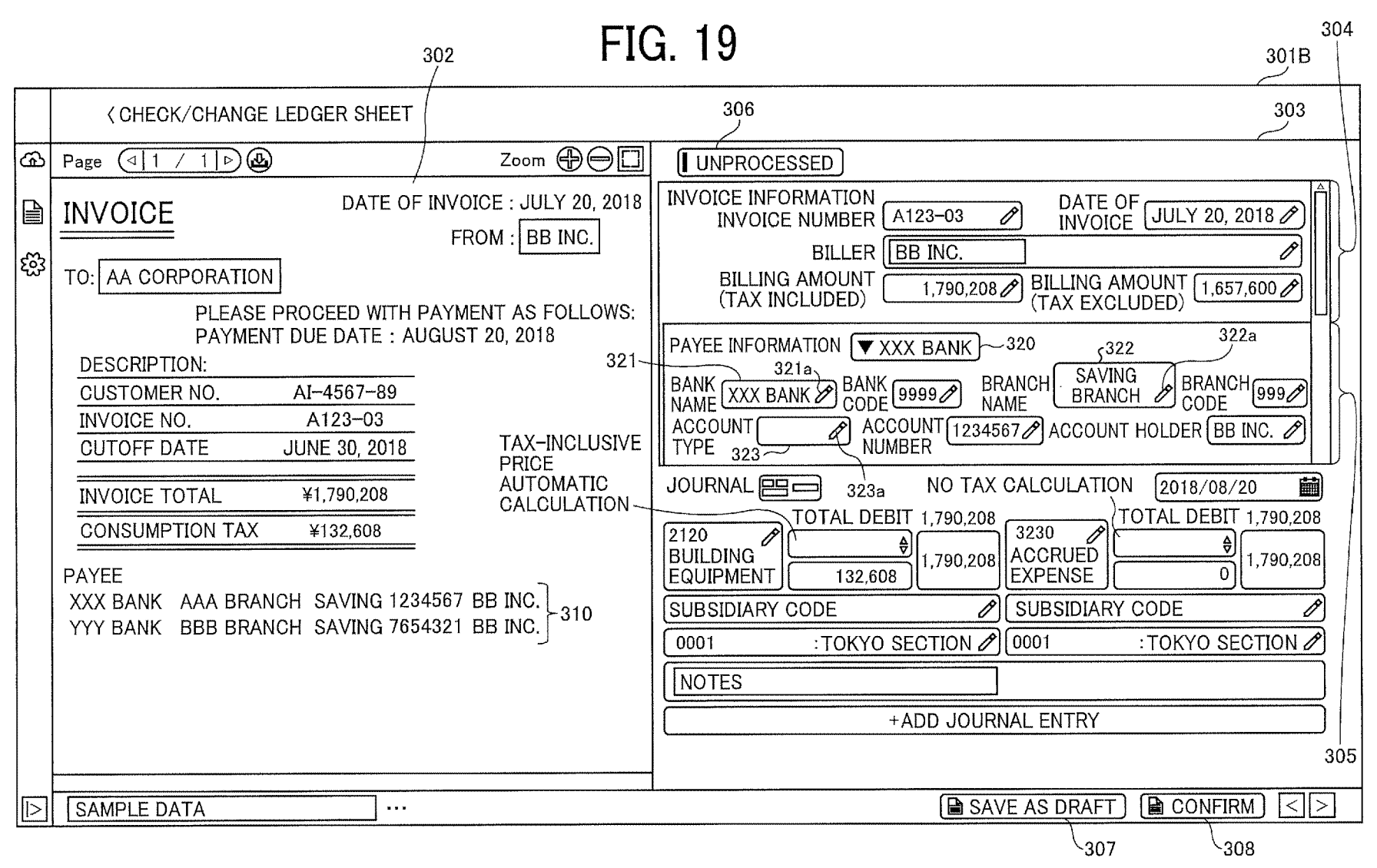

FIG. 19 is a diagram illustrating another display example. In the example described here, the contents displayed in the display field 322 are corrected on a screen 301B in FIG. 19. The screen 301B displays a character string "Saving Branch" as the branch name corresponding to the item value in the display field 322. Specifically, in the example illustrated in FIG. 19, the character string that should represent the item value of the item name "account type" has been extracted as the branch name corresponding to the bank name "XXX Bank."

In this case, the display field 323 for displaying the character string representing the item value of the item name "account type" is left blank, not displaying the character string representing the account type.

If the display component 322a in the display field 322 is selected in this case, the character strings included in the ledger sheet image are displayed in highlight.

The editing of the contents displayed in the display field 322 will be described with reference to FIG. 20.

Figure 20:
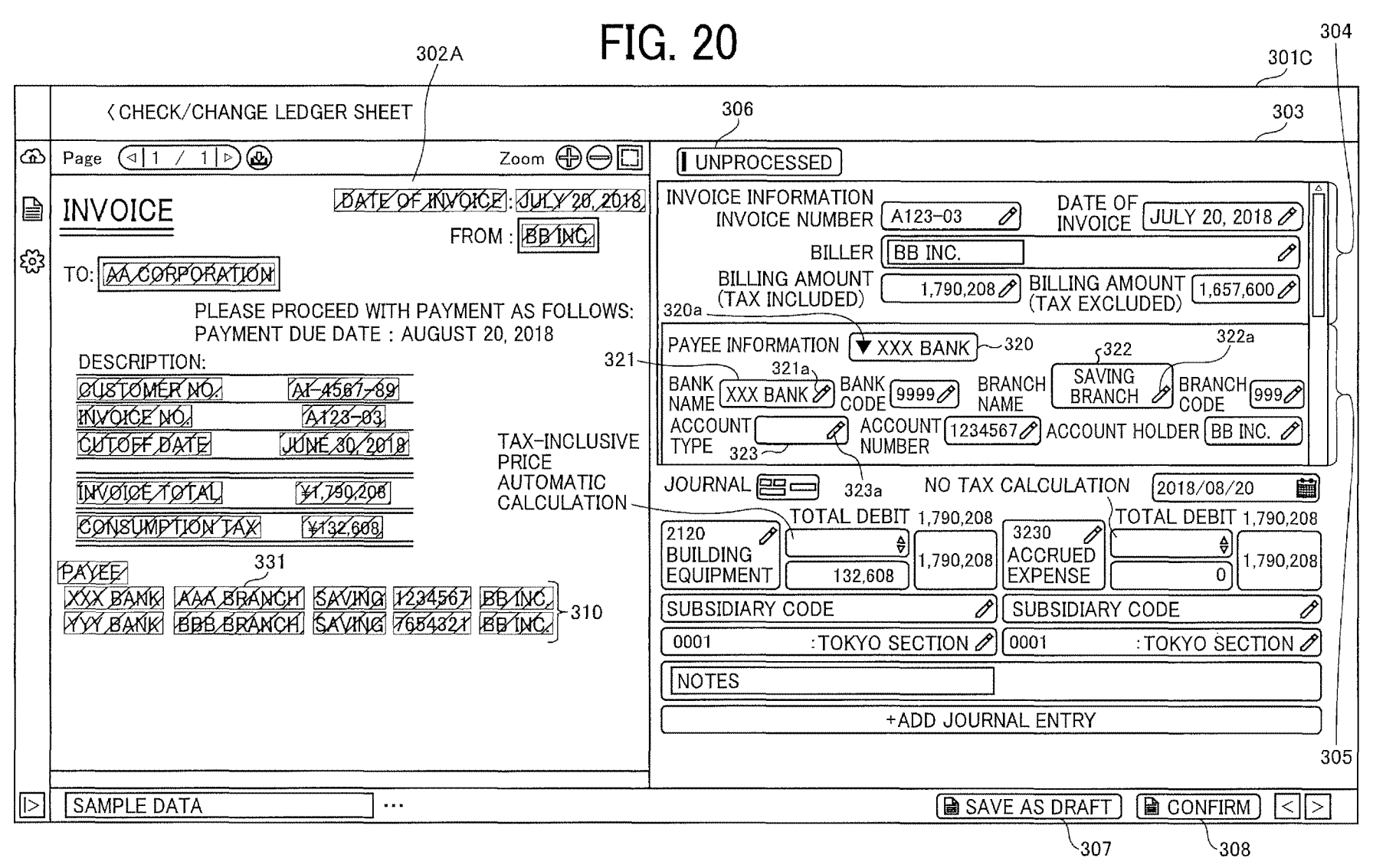

FIG. 20 is a diagram illustrating another display example. On a screen 301C illustrated in FIG. 20, the character strings included in the ledger sheet image are displayed in highlight in the display field 302A.

Then, when a character string 331, i.e., a character string "AAA Branch" representing the branch name of a branch of XXX Bank, is selected in the area 310 of the ledger sheet image, the selected character string "AAA Branch" is displayed in the display field 322. That is, the branch name "Saving Branch" in the display field 322 is corrected to the branch name "AAA Branch."

Further, when the item name in the display field 322 is corrected, the ledger sheet recognizing unit 290 of the embodiment refers to the definition information 251. The ledger sheet recognizing unit 290 then sets the corrected branch name "AAA Branch" as the extraction reference point, and performs again the process of extracting the item value for each of the item names following the item name "branch name" in the definition information 251. With this process, the item value of the item name "account type" is extracted, and the character string representing the account type is displayed in the display field 323.

Figure 21:
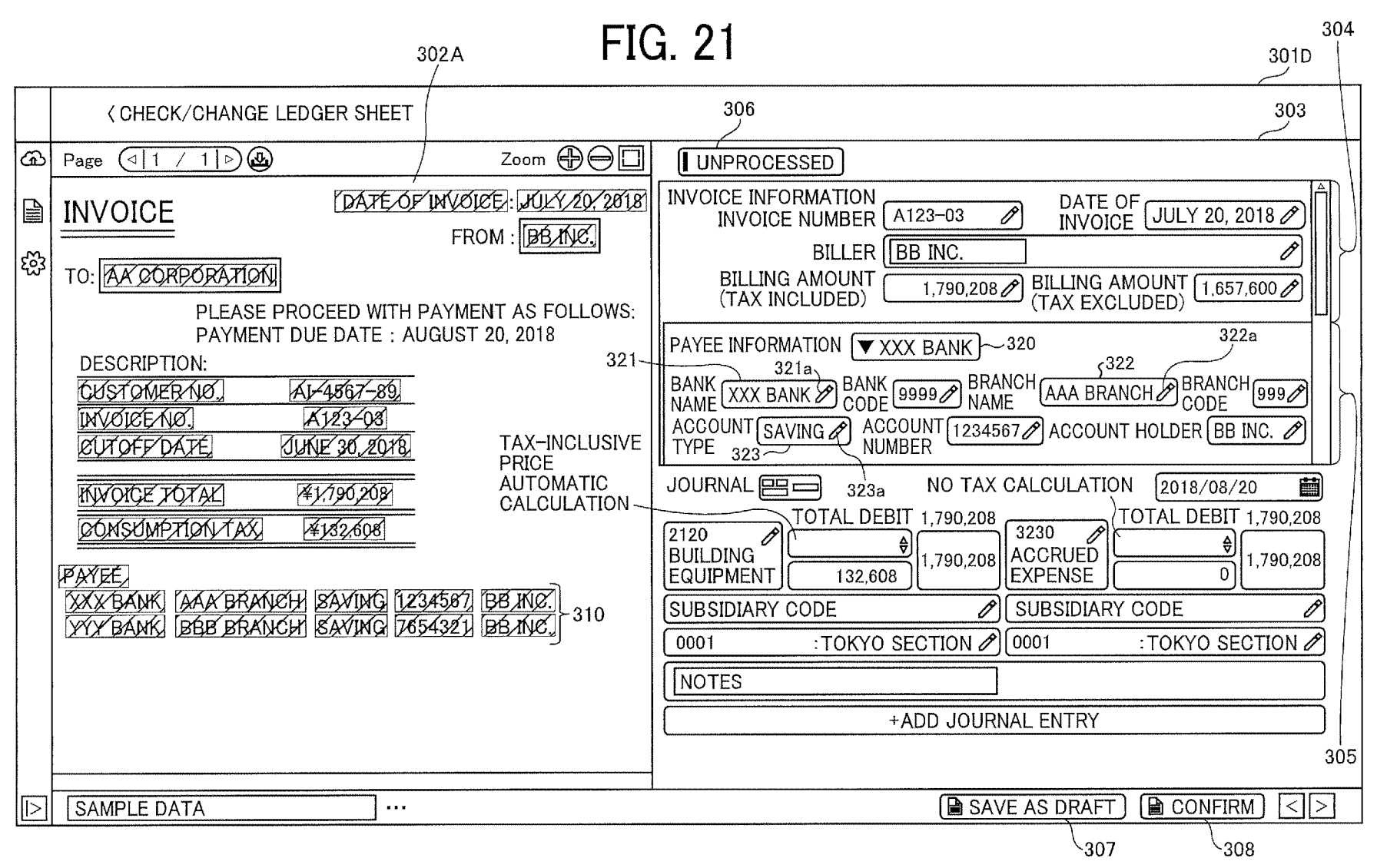

FIG. 21 is a diagram illustrating another display example. On a screen 301D illustrated in FIG. 21, a character string "saving" is displayed in the display field 323 as the item value of the item name "account type."

As described above, according to the embodiment, even if the ledger sheet recognizing unit 290 incorrectly recognizes a certain character string, the incorrectly recognized character string in the financial institution information is corrected with reference to the ledger sheet image displayed on the screen that also displays the financial institution information.

Further, according to the embodiment, when the character string representing the item value of a certain item name in the financial institution information is corrected, the item values of the other item names are extracted based on the corrected character string. According to the embodiment, therefore, correcting the item value of one item name automatically corrects the item values of the other item names, thereby improving the operability.

Figure 22:
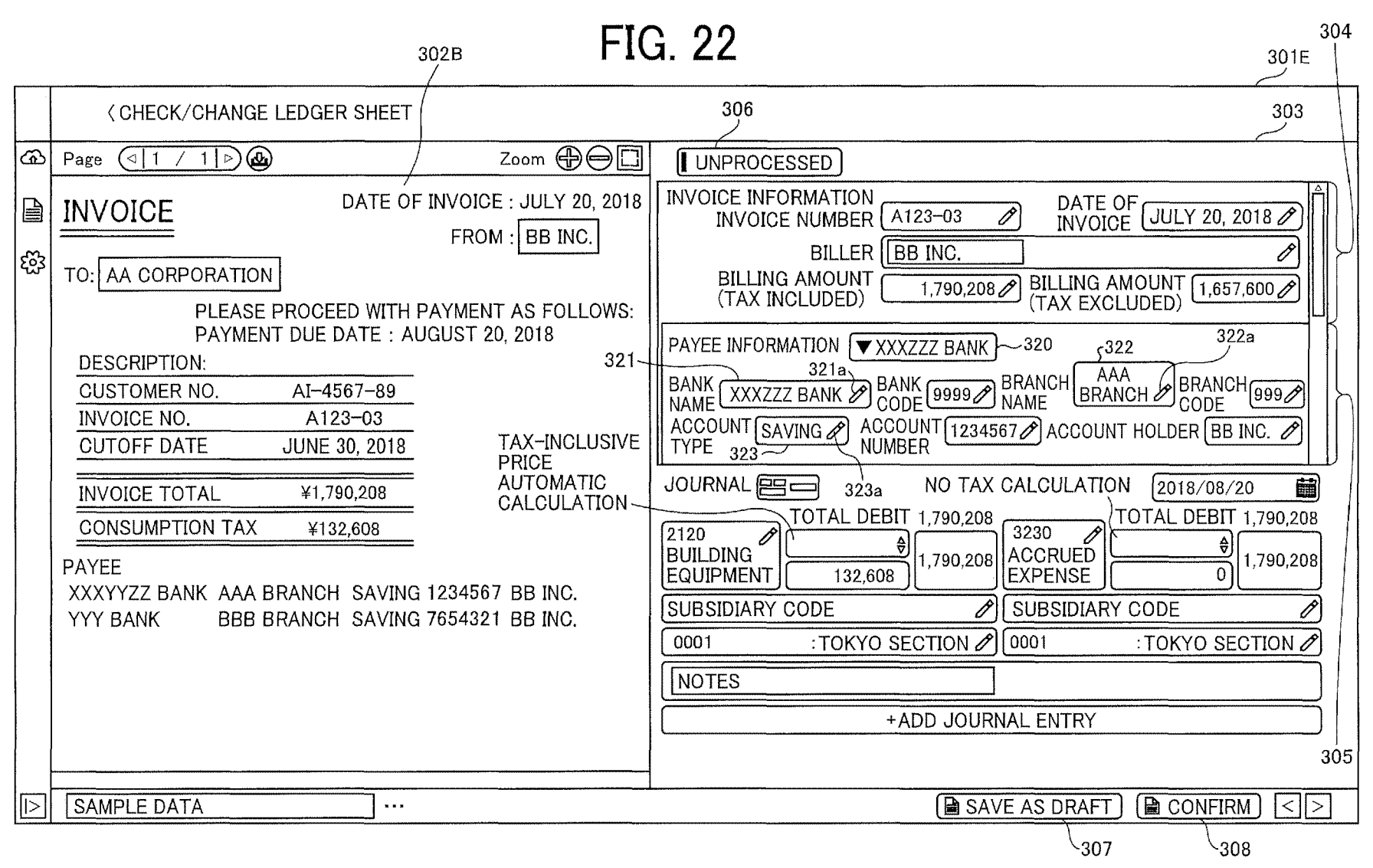

FIG. 22 is a diagram illustrating another display example. In the example described here, the dictionary information is referred to in the extraction of the character string representing an item value of the financial institution information, and the extracted character string is compared with the dictionary information to determine the item value.

In the ledger sheet image displayed in a display field 302B on a screen 301E illustrated in FIG. 22, the bank name appears as "XXXYYZZ Bank." This bank name is input in the preparation of the invoice. It is assumed in the example of FIG. 22 that the bank name "XXXYYZZ Bank" is an incorrect bank name.

In this case, the second extracting unit 296 of the ledger sheet recognizing unit 290 extracts the character string "XXXYYZZ Bank" from the ledger sheet image data as the item value of the item name "bank name " The second extracting unit 296 then compares the extracted character string "XXXYYZZ Bank" with the dictionary information (see FIG. 10).

Since the character string "XXXYYZZ Bank" is an incorrect bank name in this case, the dictionary information does not include a bank name matching the character string "XXXYYZZ Bank." The second extracting unit 296 therefore identifies, in the dictionary information, the bank name closest to the character string "XXXYYZZ Bank" as the item value of the item name "bank name." For example, the character string closest to the character string "XXXYYZZ Bank" is a character string representing a bank name and including the largest number of characters matching those of the extracted character string.

In the example of FIG. 22, a character string "XXXZZZ Bank" is displayed in the display field 305 as the bank name. This example therefore indicates that the incorrect bank name described in the invoice has been corrected to the correct bank name in the process of extracting the financial institution information.

According to the embodiment, if an incorrect character string is extracted and included in the financial institution information, the incorrect character string is replaced with the character string determined with reference to the dictionary information, as described above. In this process of the embodiment, the complemented reading result information may be referred to, and the extracted character string may be replaced with the character string associated with the extracted character string in the complemented reading result information.

According to the embodiment, the complemented reading result information is held so that even if the extraction result includes an incorrect character string, the incorrect character string is replaced with the complemented character string, as described above.

An example of data to be output to the core system 500 by the output unit 285 of the embodiment will be described with reference to FIG. 23.

FIG. 23 is a table illustrating an example of output data. Output data 231 illustrated in FIG. 23 includes data items "payer account information," "payee account information," "billing amount," and "payment transaction date."

In the output data 231 of the embodiment, the payer account information is the financial institution information of the tenant, which is included in the tenant information stored in the tenant DB 270. The payee account information is the financial institution information of the biller, which is extracted from the ledger sheet image of the invoice by the ledger sheet recognizing unit 290.

The billing amount is included in the invoice information extracted from the ledger sheet image data by the ledger sheet recognizing unit 290. The payment transaction date may be the date when the output data 231 is output to the core system 500, for example.

The output data 231 of the embodiment may be in any format enabling the core system 500 to automatically execute a process of transferring (i.e., paying) the billing amount to the biller from the tenant.

According to the embodiment, the extraction of the financial institution information from the ledger sheet image data of the invoice and the payment of the billing amount to the account represented by the extracted financial institution information are thus automatically executed.

A modified example of the process of the second extracting unit 296 will be described with reference to FIG. 24.

FIG. 24 is a table illustrating a modified example of the extraction process. The following description with FIG. 24 will be given of extraction of the financial institution information performed when the item value of the item name "bank name" fails to be extracted in the processes of FIGS. 10 and 11.

If the item value of the item name "bank name" fails to be extracted, the item values of all item names in the financial institution information are left blank. When the recognition result data including this financial institution information is displayed on the recognition result check screen, therefore, the display fields in the display field 305 are displayed blank.

If the server 200 receives, in this state, an operation of selecting the display component 321a in the display field 321 for displaying the item value of the item name "bank name," the server 200 displays the character strings in the ledger sheet image in highlight. Then, in response to specification of the character string representing the item value of the item name "bank name" among the highlighted character strings, the server 200 extracts the item values of the item name "branch name" and the subsequent item names based on the specified character string.

Further, in the embodiment, for each of all character strings of the character string set included in the reading result information, information associating the character string with the item values of the item name "branch name" and the subsequent item names extracted in response to specification of the character string as the bank name is held as information 241 illustrated in FIG. 24.

In the information 241, information items "character string ID," "branch name," "account type," "account number," and "account holder" are associated with each other. The information item "character string ID" is identification information for identifying the character string.

The information 241 illustrated in FIG. 24 indicates that, when the character string corresponding to a character string ID "18" is selected from the highlighted character strings, "AAA Branch" and "saving," for example, are extracted as the item value of the item name "branch name" and the item value of the item name "account type," respectively.

In the above-described embodiment, the invoice has been described as an example of the ledger sheet. The type of ledger sheet to which the embodiment is applied, however, is not limited to the invoice. The embodiment is applicable to any type of ledger sheet in which a certain character string included in the reading result information is associated with a plurality of character strings.

Specifically, for example, the ledger sheet may be a statement of delivery, in which a character string "delivery address" included in the reading result information is associated with the company name and the address corresponding to the delivery address. In this case, the item value of the item name "company name" may be identified based on the relative positions of the character string "delivery address" and the character string "company name " Further, the item value of the item name "address" may be identified based on the relative positions of the character string "company name" and the character string "address." In this case, the character string representing the item value of the item name "company name" is the first character string, and the character string representing the item value of the item name "address" is the second character string.

The apparatuses described in the embodiment form one of a plurality of computing environments for implementing the embodiment disclosed in the present specification.

In an embodiment of the present invention, the server 200 is a server cluster including a plurality of computing devices configured to communicate with each other via a desired type of communication link such as a network or a shared memory, for example, to execute the processes disclosed in the present specification. Similarly, the server 200 may include a plurality of computing devices configured to communicate with each other.

Further, the server 200 may be configured to share the disclosed process steps with another apparatus in various combinations. For example, a process executed by the server 200 may be executed by another server. Similarly, a function of the server 200 may be executed by another server. Further, the components of the server 200 and the components of another server may be integrated in a single server, or may be distributed to a plurality of apparatuses.

The correspondence tables described in the present specification may be generated as a result of machine learning. Further, if keywords and account items that may be included in a transaction description are categorized by machine learning, it is unnecessary to use the correspondence tables.

Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a combination of two or more of these learning methods. The learning method for machine learning is not limited to a particular method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus comprising circuitry configured to receive an input of ledger sheet image data read from a ledger sheet, identify, among a plurality of character strings extracted through character recognition performed on the ledger sheet image data, a reference point character string based on relative positions of the reference point character string and a particular character string of the plurality of character strings, the reference point character string forming a reference point for extraction, and extract a corresponding character string corresponding to the reference point character string based on relative positions of the corresponding character string and the reference point character string, in response to extracting the corresponding character string, refer to dictionary information stored in a dictionary database, compare the extracted corresponding character string to the dictionary information, determine a character string representing an item value based on the comparison, in response to determining the character string representing the item value, generate recognition result data associating financial institution information with the ledger sheet image data, and register storage location information of the recognition result data in a job list.

2. The information processing apparatus of claim 1, wherein with reference to definition information defining the reference point character string, the circuitry determines the reference point character string identified among the plurality of character strings as a first reference point character string.

3. The information processing apparatus of claim 2, wherein the circuitry determines the corresponding character string extracted based on the relative positions of the corresponding character string and the reference point character string as a next reference point character string.

4. The information processing apparatus of claim 2, wherein with the definition information associating the reference point character string with the item name, the circuitry determines the corresponding character string extracted based on the relative positions of the corresponding character string and the reference point character string as the item value of the item name associated with the reference point character string.

5. The information processing apparatus of claim 4, wherein the circuitry generates screen data for displaying the recognition result data including a ledger sheet image and association information, the ledger sheet image being represented by the ledger sheet image data, and the association information associating the item name with the item value.

6. The information processing apparatus of claim 5, wherein with the item name being included in information related to the financial institution, the circuitry generates financial institution information associating the item name with the item value.

7. The information processing apparatus of claim 6, wherein with the ledger sheet being an invoice, the circuitry extracts invoice information related to the invoice from the plurality of character strings, and includes the invoice information in the recognition result data in association with the financial institution information.

8. An information processing system comprising:
the information processing apparatus of claim 1; and
a terminal apparatus including a display, the circuitry of the information processing apparatus configured to output screen data for displaying a recognition result screen, the recognition result screen including
a ledger sheet image represented by the ledger sheet image data, and
information including the corresponding character string extracted based on the relative positions of the corresponding character string and the reference point character string, and
the display of the terminal apparatus being configured to display the recognition result screen based on the screen data.

9. An information processing method comprising:
receiving an input of ledger sheet image data;
identifying, among a plurality of character strings extracted through character recognition performed on the ledger sheet image data, a reference point character string forming a reference point for extraction; and
extracting a corresponding character string corresponding to the reference point character string based on relative positions of the corresponding character string and the reference point character string,
in response to extracting the corresponding character string, referring to dictionary information stored in a dictionary database,
comparing the extracted corresponding character string to the dictionary information,
determining a character string representing an item value based on the comparison.
in response to determining the character string representing the item value, generating recognition result data associating financial institution information with the ledger sheet image data, and
registering storage location information of the recognition result data in a job list.

10. A non-transitory recording medium storing a plurality of instructions which, when executed by one or more processors, cause the processors to perform an information processing method comprising:
receiving an input of ledger sheet image data;
identifying, among a plurality of character strings extracted through character recognition performed on the ledger sheet image data, a reference point character string forming a reference point for extraction; and
extracting a corresponding character string corresponding to the reference point character string based on relative positions of the corresponding character string and the reference point character string,
in response to extracting the corresponding character string, referring to dictionary information stored in a dictionary database,
comparing the extracted corresponding character string to the dictionary information,
determining a character string representing an item value based on the comparison,
in response to determining the character string representing the item value, generating recognition result data associating financial institution information with the ledger sheet image data, and
registering storage location information of the recognition result data in a job list.

* * * * *